US008442328B2

(12) United States Patent
Stankiewicz et al.

(10) Patent No.: US 8,442,328 B2
(45) Date of Patent: May 14, 2013

(54) SYSTEMS AND METHODS FOR EVALUATING ROBUSTNESS OF SALIENCY PREDICTIONS OF REGIONS IN A SCENE

(75) Inventors: Brian J. Stankiewicz, Mahtomedi, MN (US); Brian E. Brooks, Saint Paul, MN (US); Brian L. Linzie, Stillwater, MN (US); Nathan J. Anderson, Woodbury, MN (US); Michael Kelly Canavan, Minneapolis, MN (US); Glenn E. Casner, Woodbury, MN (US); Timothy J. Gardner, Saint Paul, MN (US); David K. Misemer, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 775 days.

(21) Appl. No.: 12/571,850

(22) Filed: Oct. 1, 2009

(65) Prior Publication Data

US 2010/0086221 A1 Apr. 8, 2010

Related U.S. Application Data

(60) Provisional application No. 61/102,618, filed on Oct. 3, 2008.

(51) Int. Cl.
*G06K 9/00* (2006.01)

(52) U.S. Cl.
USPC .......................................................... 382/224

(58) Field of Classification Search ........................ None
See application file for complete search history.

(56) References Cited

U.S. PATENT DOCUMENTS

| | | | | |
|---|---|---|---|---|
| 7,130,461 | B2 | 10/2006 | Rosenholtz | |
| 7,260,261 | B2 | 8/2007 | Xie et al. | |
| 7,471,827 | B2 | 12/2008 | Xie et al. | |
| 7,595,809 | B2 | 9/2009 | Widdowson et al. | |
| 7,668,400 | B2 | 2/2010 | Widdowson et al. | |
| 7,844,075 | B2 | 11/2010 | Pilu | |
| 2004/0165784 | A1 | 8/2004 | Xie et al. | |
| 2006/0070026 | A1 | 3/2006 | Balinsky et al. | |
| 2006/0215922 | A1 | 9/2006 | Koch et al. | |
| 2007/0253028 | A1 | 11/2007 | Widdowson | |
| 2008/0123993 | A1 | 5/2008 | Widdowson | |
| 2010/0086200 | A1* | 4/2010 | Stankiewicz et al. | 382/154 |
| 2010/0086278 | A1* | 4/2010 | Stankiewicz et al. | 386/52 |

FOREIGN PATENT DOCUMENTS

| | | |
|---|---|---|
| WO | 2007/079256 | 7/2007 |
| WO | 2007-125732 | 11/2007 |

OTHER PUBLICATIONS

Frintrop, S. (Sep. 2008) "The high repeatability of salient regions." Proc. Workshop on Vision in Action.*

Heidemann, G. (Jun. 2007) "Region saliency as a measure for colour segmentation stability." Image and Vision Computing, vol. 26 No. 2, pp. 211-227.*

Le Meur, O. (Sep. 2011) "Robustness and repeatability of saliency models subjected to visual degradations." 2011 18$^{th}$ IEEE Int'l Conf. on Image Processing, pp. 3285-3288.*

(Continued)

*Primary Examiner* — Barry Drennan
(74) *Attorney, Agent, or Firm* — X. Christina Huang

(57) ABSTRACT

Systems and methods for evaluating the robustness of objects within a scene or a scene itself.

37 Claims, 20 Drawing Sheets

OTHER PUBLICATIONS

Mikolajczyk et al. (2004) "Scale & affine invariant interest point detectors." Int'l J. Comp. Vision, vol. 60 No. 1, pp. 63-86.*
Li-Qun Chen, Xing Xie, Xin Fan, Wei-Ying Ma, Hong-Jiang Zhang, and He-Qin Zhou: "A Visual Attention Model for Adapting Images on Small Displays"; Multimedia Systems, 2003, pp. 1-12.
El-Nasr, M. S.; "Intelligent Lighting for Game Environments", Journal of Game Development, vol. 1, Jan. 1, 2005, pp. 17-50.
Dashan Gao et al.: "An Experimental Comparison of Three Guiding Principles for the Detection Salient Image Locations: Stability, Complexity, and Discrimination", Computer Vision and Pattern Recognition, 2005 IEEE Computer Society Conference on, IEEE, Piscataway, NJ, USA, Jun. 25, 2005, pp. 84, (XP031259726 ISBN: 978-0-7695-2372-9).
Feng-Gui.com; Feng-Gui Help, Retrieved from the Internet: URL: http://web.archive.org/web/20080624073248/222.feng-gui.com/faq.htm, retrieved on Feb. 4, 2010, 2 pages.
Gao et al.: "On the Plausibility of the Discriminant Center-Surround Hypothesis for Visual Saliency", Journal of Vision, Association for Research in Vision and Opthalmology, US., vol. 8, No. 7, Jun. 13, 2008, pp. 1-18, (XP009126670 ISSN: 1534-7362).
Heidemann et al.; "Region Saliency as a Measure for Colour Segmentation Stability", Image and Vision Computing Elsevier, Guildford, GB, vol. 26, No. 2, Nov. 9, 2007, pp. 211-227 (XP022338753 ISSN: 0262-8856).
Itti, L. et al.: "A Model of Saliency-Based Visual Attention for Rapid Scene Analysis", IEEE Transactions on Pattern Analysis and Machine Intelligence, vol. 20, No. 11, Nov. 1, 1998, pp. 1254-1259.
Itti, L. et al.: "A Saliency-Based Search Mechanism for Overt and Covert Shifts of Visual Attention", Vision Research, Pergamon Press, Oxford, GB, vol. 40, No. 10-12, Jun. 1, 2000, pp. 1489-1506, (XP008060077 ISSN: 0042-6989).
Itti, L. et al.: "Computational Modelling of Visual Attention", Nature Neuroscience, vol. 2, Jan. 1, 2001, pp. 194-203.
Itti, L. et al.: "Modeling the Modulatory Effect of Attention on Human Spatial Vision", Advances in Neural Information Processing systems (NIPS*2001), vol. 14, (T.G. Dietterich, S. Becker, Z. Ghahramani Ed.), Cambridge, MA:MIT Press, Aug. 2002, pp. 1247-1254.
Itti, L. et al.: "Visual Attention and Target Detection in Cluttered Natural Scenes", Optical Engineering, vol. 40, No. 9, Sep. 2001, pp. 1784-1793.
Lee et al.: "Mesh Saliency", Proceedings of ACM Siggraph, vol. 24, No. 3, 2005, pp. 659-666.
Rothkopf, C.A., Ballard, D. HJ., and Hayhoe, M. M.; "Task and Context Determine Where You Look", Journal of Vision, vol. 7, No. 14, Jan. 1, 2007, pp. 1-20.
Shao et al.: "Geometric and Photometric Invariant Distinction Regions Detection", Information Sciences, Amsterdam, NL, vol. 177, No. 4, Nov. 24, 2006, pp. 1088-1122, (XP005779668 ISSN: 0020-0255).
Shive et al.: "Applying Models of Visual Search To Map Display Design", International Journal of Human-Computer Studies, Academic Press, New York, NY. vol. 66, No. 2, Nov. 19, 2007, pp. 67-77.
Torralba, A., "Contextual Modulation of Target Saliency", Adv. in Neural Information Processing Systems, vol, 14 (NIPS), Jan. 1, 2001, MIT Press, 2001. pp. 1-8.
Yamauchi et al.: "Towards Stable and Salient Multi-View Representation of 3D Shapes", Proceedings of the IEEE International Conference on Shape Modeling and Application, Jun. 14, 2006, 6 pages.
U.S. Appl. No. 61/102,618, "Systems and Methods for Evaluating Robustness" filed Oct. 3, 2008.
U.S. Appl. No. 61/102,625. "Systems and Methods for Optimizing a Scene", filed Oct. 3, 2008.
U.S. Appl. No. 61/102,670, "Systems and Methods for Multi-Perspective Scene Analysis", filed Oct. 3, 2008.
International Search Report, form PCT/ISA/210, PCT/US2009/059225, Intl Filing Date: Jan. 10, 2009, 3 pages.

* cited by examiner

SYSTEMS AND METHODS FOR EVALUATING ROBUSTNESS OF SALIENCY PREDICTIONS OF REGIONS IN A SCENE

CROSS REFERENCE TO RELATED APPLICATION

This application claims the benefit of U.S. Provisional Patent Application No. 61/102,618, filed Oct. 3, 2008, the disclosure of which is incorporated by reference herein in its entirety.

RELATED APPLICATIONS

This application is also related to U.S. Provisional Patent Application No. 61/102,625, filed Oct. 3, 2008 and U.S. Provisional Patent Application No. 61/102,670, filed Oct. 3, 2008.

BACKGROUND

The human visual system is a capacity limited system in that it can only process a relatively small number of objects at any given time. This is true, despite the fact that there are many objects that may be visible at any given time. From the array of objects visible to a human, that human's visual system will only attend to, or processes, one (or very few) objects at any given time. When a human looks at an image or a scene, his visual system will shift attention (and mental processing) from one object to another.

There has been a substantial amount of research in the area of human visual attention. This research has generated numerous studies directed toward understanding the behavior of human visual attention, as well as many computational models of visual attention. These computation models (sometimes called visual attention models, eye-gaze prediction models, attention models, or saliency models) predict where, given visual stimuli (for example, a picture or a scene), a person will allocate their visual attention or gaze.

These models provide predictions about the objects or regions within the scene that will attract visual attention. Typical real world scenes, however, are often highly dynamic. The image projected to the human will change when, for example, the person's vantage point changes, the objects within a scene change positions or orientation, or the lighting changes (casting different shadows). Furthermore, the observer himself may introduce uncertainty into the predictions (the observer may be pre-occupied, or otherwise disposed to a particular attention pattern). Any variability in the image projected from a scene, or variability across observers, or even small changes to the scene itself, can significantly change the predictions made by these models. This can be problematic when using visual attention models in applied settings.

SUMMARY

Systems and methods for evaluating, and in some embodiments quantifying, the robustness of objects within a scene, or the robustness of a scene itself to scene and observer variability. Particularly, methods for introducing variability to a scene and/or to the computation model of visual attention, then evaluating the effect these variations have on where visual attention will be predicted to be allocated.

In one embodiment, a computer system is described having a visual attention module operative to: (a) receive scene input; (b) apply a visual attention model to the scene input; and, (c) predict regions within the scene input that tend to attract visual attention; and, a robustness assessment module operative to interact with the visual attention module to determine a degree to which at least one of the identified regions is robust or the scene is robust.

In another embodiment, a computer-implemented method is described, comprising: receiving scene input; applying a visual attention model to the scene input to predict regions within the scene input that tend to attract visual attention; changing the scene so as to produce a modified scene; applying the visual attention model to the modified scene input to predict regions within the scene input that tend to attract visual attention; and, based on the regions identified from the application of the visual attention model to the scene input and the modified scene, determining the degree to which one of the identified regions, or the scene input, is robust.

In another embodiment, a computer-implemented method is described, comprising: receiving scene input; applying a visual attention model to the scene input to predict regions within the scene input that tend to attract visual attention; changing the visual attention model so as to produce a modified visual attention model; applying the modified visual attention model to the scene input to predict regions within the scene input that tend to attract visual attention; and, based on the regions identified from the application of the visual attention model and the modified visual attention model to the scene input, determining the degree to which one of the identified regions, or the scene input, is robust.

DETAILED DESCRIPTION

Visual Attention Models

Visual attention models determine the extent to which regions within a scene differ with respect to the likelihood that they will attract visual attention or attract eye movements. A scene is any form of input (for example, graphical image) that is amenable to evaluation by a visual attention model, and may, for instance, be a digital photograph, a virtual 3D scene, a web page, a document, or a video.

A visual attention model's disposition to an object refers to how a model of visual attention characterizes the relative saliency of an object within a scene. For example, some visual attention models will superimpose a trace line around predicted objects. Other visual attention models will generate heat maps that may be superimposed over the image or viewed separately from the image. Even others may generate and assign a value to a particular object and/or region, with the value representing that object's saliency in relative terms. In the context of trace lines, the disposition of an object may be considered as "selected" (when traced) or "not selected" by the model. In the context of heat maps, the disposition of an object is the degree to which the algorithm has selected the object (or not selected the object). And in the context of a saliency number, the disposition of the object may be the saliency number itself.

There are many visual attention models that predict where within a scene human visual attention will be allocated. Generally, these visual attention models take a single image of an environment as input and generate predictions about where attention will be allocated within that scene. Empirical approaches expose human subjects to a scene and track their eye movement. This empirical approach is resource intensive, however, so a number of mathematic models have been developed that attempt to predict attention by analysis, at least in part, of the scene. That said, empirical approaches could also be used as part of the systems and methods described herein, and as used herein an empirical approach is deemed to be a type of visual attention modeling.

Figure 1:
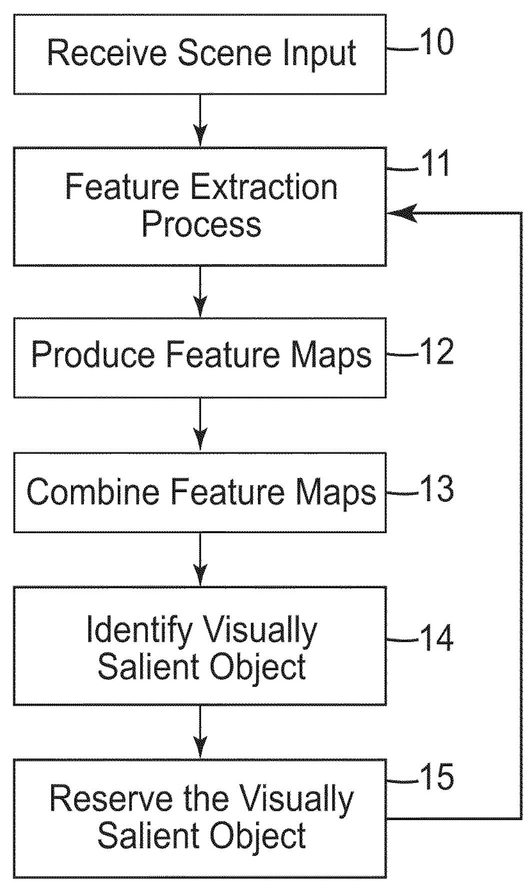
FIG. 1 is a flowchart illustrating high-level functioning of a representative visual attention module.

The basic methodology of one of these models is represented in FIG. 1, which is that proposed by Itti, L. & Koch, C. (2000), *A saliency-based search mechanism for overt and covert shifts of visual attention*, Vision Research, vol. 40, pages 1489-1506. At a high level, FIG. 1 shows how a prediction is made for visual attention by assessment of "bottom-up" features such as color, motion, luminance, edges, etc. which serve as building blocks of the visual representations mediating some aspects of human vision. First, a scene, in the form of a digital photograph, is provided to a computer-implemented version of the Itti and Koch model (step 10). Next, a feature extraction process analyzes the digital photograph for colors, intensity, orientations, or other scene cues, such as motion, junctions, terminators, stereo disparity, and shape from shading (step 11). The feature extraction process yields a plurality of feature maps (step 12), which are combined to produce a saliency map (step 13). In the case of the Itti and Koch model, the saliency data is provided to a user as a rendering of the original digital photograph with the "brightest" objects being to which the model has predicted visual attention will be next allocated. This predicted object is identified to be visually salient (step 14) in a "winner-take-all" type algorithm (step 15), and the process then repeats until a plurality of objects are identified by the model.

Figure 2:
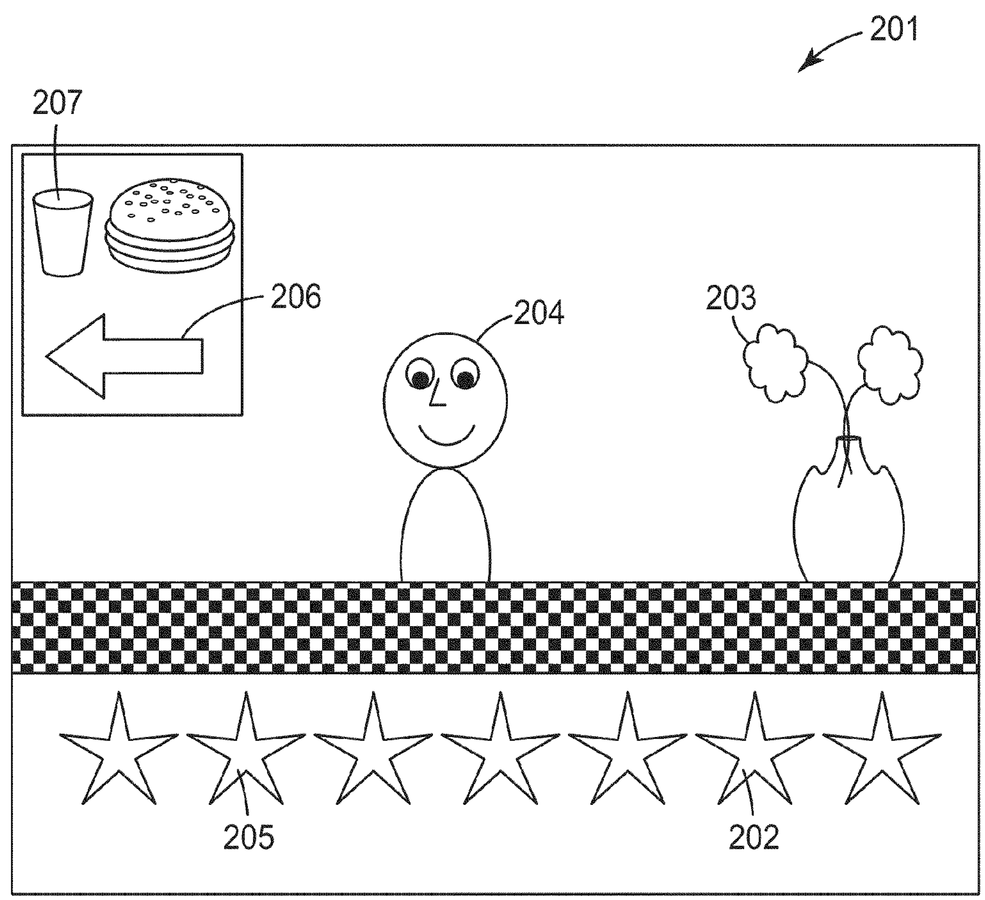
FIG. 2 is a sketch of a representative scene.

FIG. 2 is an artist's rendering of a scene 201 that could be provided to a visual attention model such as Itti and Koch. It is a simplified scene included here for illustrative purpose only; in practice the scenes are often actual digital photographs, or videos, and are much more complex. FIG. 2 includes a number of objects within the scene, such as the star 202, flower 203, face 204, star 205, arrow 206, and cup 207.

Figure 3A:
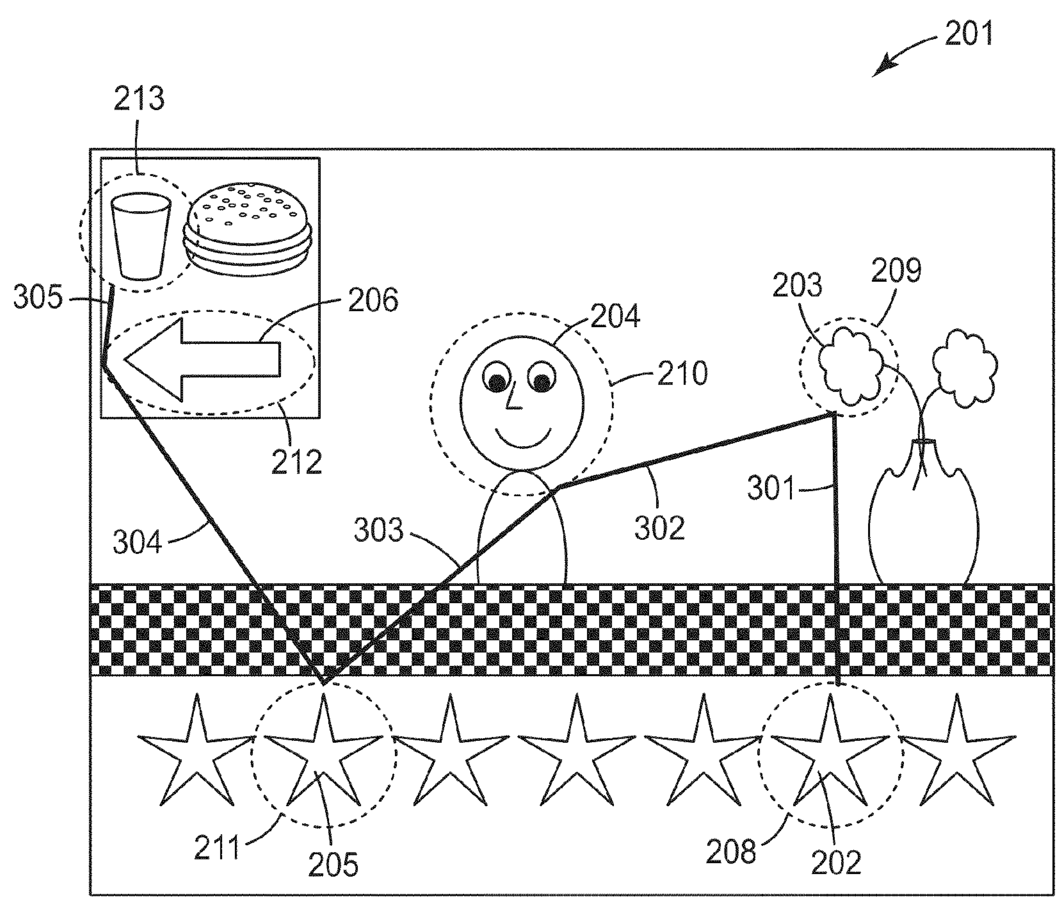
FIG. 3A is an artist's rendering of output from a visual attention module.

FIG. 3A is an artist's rendering representing how output from the Itti and Koch model could be represented. The highlighted (and in this representative illustration, encircled) objects are those that the model predicts to be visually salient. For example, star 202 is in this figure within highlight border 208; flower 203 is within border 209; face 204 is within border 210; star 205 is within border 211; arrow 206 is within border 212; and cup 207 is within border 213. Thus the model in this instance has determined six objects that are, relative to other objects, more visually salient. This particular model also predicts how attention will move among the objects determined to be above some visual saliency threshold. For example, visual attention pathway 301, 302, 303, 304, and 305 show a predicted visual attention pathway.

Figure 3B:
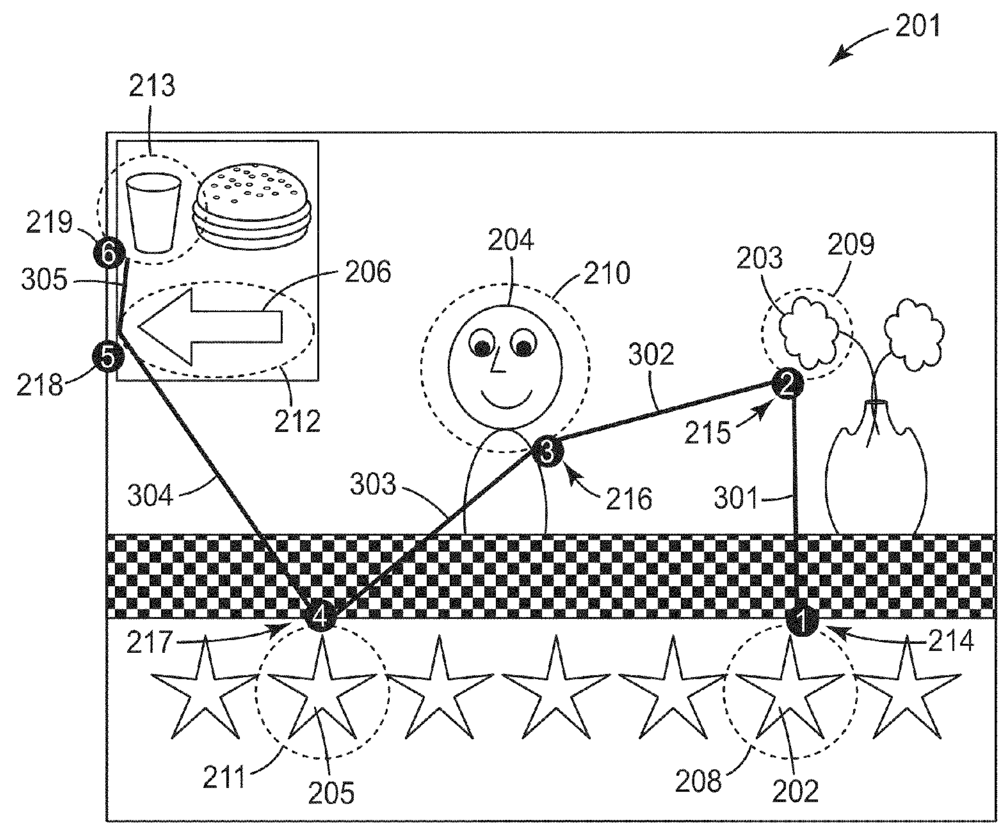
FIG. 3B is an artist's rendering of output from a visual attention module.

FIG. 3B is a second artist's rendering showing a further manner in which output from the Itti and Koch model is sometimes represented. In addition to what is shown in FIG. 3A, FIG. 3B includes the sequence of predicted visual attention. For example, star 202 is labeled "1" (attention sequence number 214), and flower 203 is labeled "2" (attention sequence number 215) and so forth.

Of course, FIG. 3A and FIG. 3B are just one manner in which a visual attention prediction may be conveyed to a user; different models represent this information (or some subset of it) in different ways. For example, not every model determines a predicted attention sequence, though such an attention sequence could be arrived at by determining the object with the highest level of visual saliency, then eliminating that object and finding the next highest, etc.

Itti and Koch's model is representative of a "bottom-up" visual attention model, in that it makes its predictions based on analysis of the particulars of the scene. Other bottom-up visual salience models are described in these references: *Gao, Mahadevan, and Vesconcelos* (2008).

Besides bottom-up models, there is another class of models referred to as "top down" models of visual attention. In contrast to bottom-up models, these models start with a scene and either an explicit task (for example, avoiding obstacles and collecting objects) or prior knowledge of the world that will influence where attention will be allocated during a specific search task (for example, chairs tend to be on the floor and not on the ceiling). This knowledge (both task- and scene-based) is used in conjunction with the bottom-up features to direct attention to objects within the observed scene. Some exemplary top-down models are described in Rothkopf, C. A., Ballard, D. H. & Hayhoe, M. M. (2007), Task and context Determine Where You Look, Journal of Vision 7(14):16, 1-20; and also in Torralba, A., Contextual Modulation of Target Saliency, Adv. in Neural Information Processing Systems 14 (NIPS), (2001) MIT Press, 2001. For example, Torralba's model of visual attention has prior knowledge about the features that comprise a particular type of object and information about the absolute and relative locations of these objects within the scene. This prior knowledge provides "top-down" influences on searching for specific targets within a scene.

The art has evolved to include hybrid visual attention models that have features of both bottom-up and top-down design, and adapted for differences in the types of scenes the models will be exposed to (for example video versus still images, outdoor images versus web pages, and so forth).

Robustness

Robustness refers to the sensitivity of predictions output from a visual attention model to either of, or some combination of:

(a) changes and/or variability within the visual properties of a scene, which includes, for example, the arrangement of objects within the scene, lighting of the objects, the color of objects, etc. (referred to as "external variability"); or, (b) changes and/or variability within an observer, or the model of observation (referred to as "internal variability").

The term object as use herein refers to either a thing or area or region within a scene, as the case may be, or the regions within a scene that are analyzed by a visual attention model. The term object is used interchangeably with "area" or "region" as the case may be.

The two types of changes (a) and (b) are referred to collectively as internal or external, or IE, changes, and various methods of introducing, then evaluating, such changes are discussed further below.

Robustness evaluation is a method for measuring the effect of IE changes on where attention will be allocated within a scene. Robustness of an object within a scene, then, is the degree to which a visual attention model's predicted disposition of a particular object changes, or does not change, despite IE changes.

The robustness of a group of objects is the degree to which a visual attention model's disposition to more than one object (a collection of objects) changes or does not change with IE changes.

Robustness of a scene is a measure of the degree to which the visual attention model's disposition of objects in the scene will change, or not change, despite IE changes. For example, if a visual attention model predicts that attention or fixations will be made to the same four objects within a scene, and these four objects tend to remain predicted by the visual attention model despite IE changes, the scene tends to be more robust than a if the four objects changed following IE changes.

Visual Attention Robustness Assessment System

Figure 6:
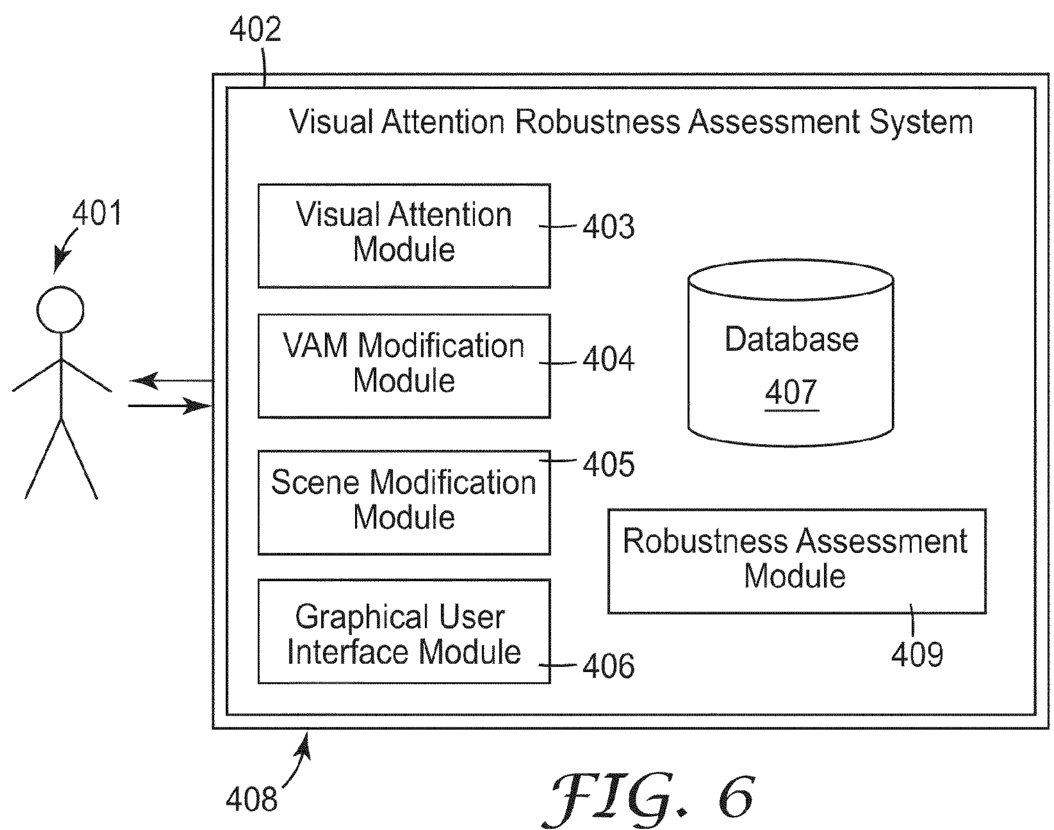
FIG. 6 is a diagram of functional modules in a system for evaluating the robustness of a scene, or objects within a scene.

FIG. 6 is a diagram showing exemplary functional modules in visual attention robustness assessment system 403, which is a system for evaluating the robustness of a scene, or the robustness of objects within a scene, or the robustness of objects across multiple scenes. Of course, these methods may also be practiced manually. Visual attention robustness assessment system is, in the embodiment shown in FIG. 6, within computer system 408. Computer system 408 may be any general purpose or application-specific computer or device. It may be a stand-alone laptop computer, or a plurality of networked computers. Further, computer system 408 may be a handheld computer, digital camera, or a tablet PC, or even a cellular telephone. Computer system 408, in one embodiment, has various functional modules (not shown in FIG. 6) that comprise an operating system. Such an operating system facilitates the visual attention robustness assessment system's access to the computer system's resources. Computer system 408 has a processor and memory, and various traditional input/output interfaces.

Visual attention module 403 is any embodiment of any visual attention model or combination of models. As mentioned earlier, there are different types of visual attention models, but they all, to some extent, predict an object or area within a scene to which visual attention will tend to be allocated. Visual attention module 403 is shown in FIG. 6 as part of visual attention robustness assessment system 402, but visual attention module 403 in another embodiment operates as a stand-alone computer process or even as a service provided over any type of computer network (such as the World Wide Web) at a remote computer.

VAM modification module 404 is the visual attention module modification module. VAM modification module 404 modifies aspects of the visual attention module's parameters or architecture. This modification can by accomplished in many ways depending on the implementation of the visual attention module 403. For example, visual attention module 403 may itself support function calls that modify aspects of how the visual attention module works. In one embodiment, visual attention module 403 may support a function call that modifies weighting given to certain aspects of the scene (brightness, for example). In another embodiment, if the visual attention module is invoked via command line, various switches could be employed to change variables that are within the visual attention module. Alternatively, if the visual attention module 403 is embodied in a script or programming code, the IE modification module could modify the script or programming code itself. In another embodiment, the entire visual attention model is replaced by another visual attention model. The particular ways in which the VAM modification module 404 modifies the visual attention module 403's underlying visual attention model (or the application of such a model to a scene) is discussed further below, but one example might be to modify the weights associated with the plurality of feature maps that are used to generate the saliency map. This could be accomplished through a function call that would modify these values based upon a distribution of acceptable values.

Figure 7:
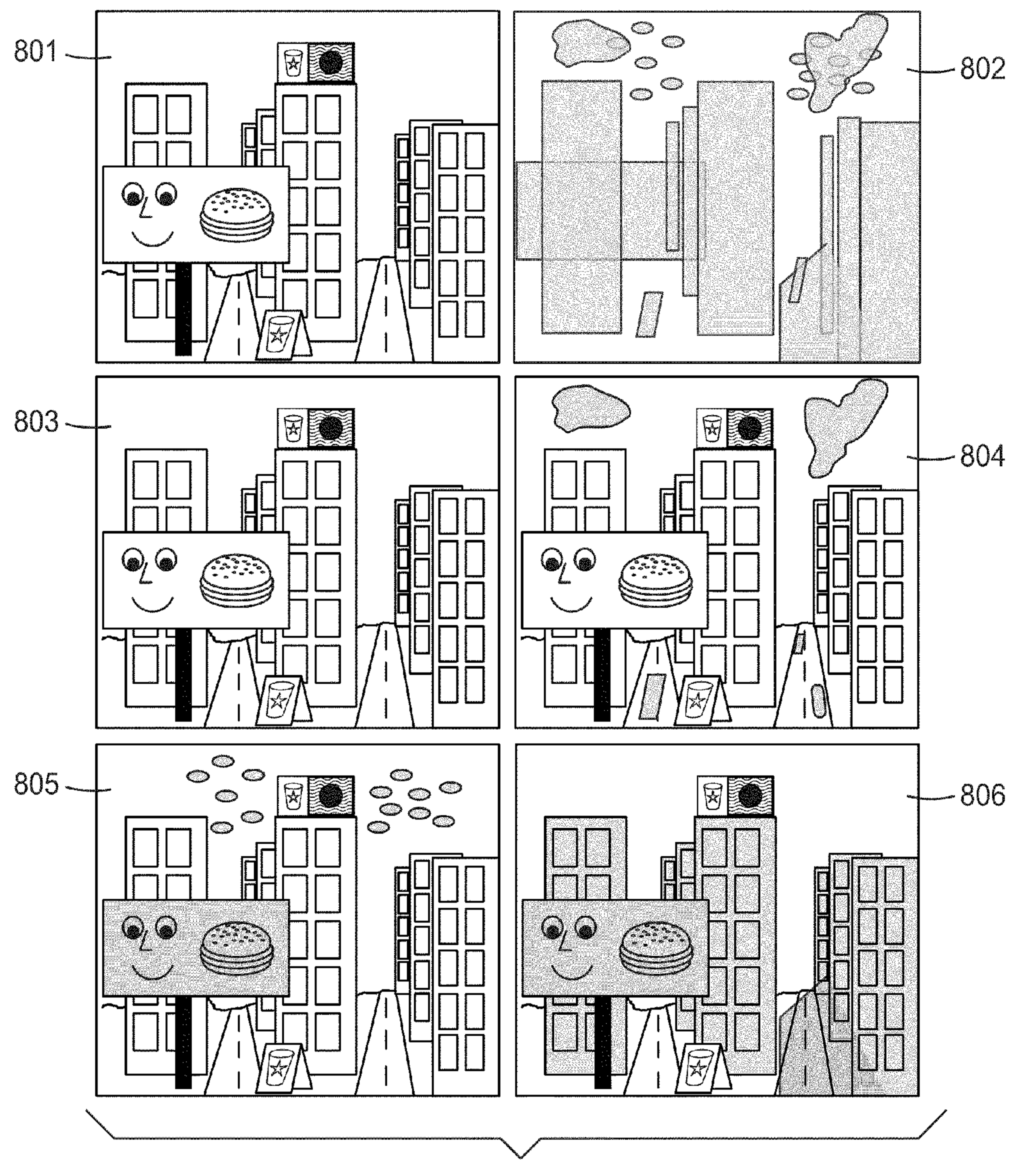
FIG. 7 is an illustration showing example scene modifications.

Scene modification module 405 modifies the scene that will be provided to the visual attention module 403 for analysis. The scene changes are the changes that are associated with the external environment that simulate the dynamic nature of the environment. Such external variability may include, for example, moving objects within the scene (for example, the placement of pedestrians), changes in shadows due to changes in lighting direction, or changes in atmospheric conditions (for example, dust in the air). This variability can be generated in a number of ways. One method is to place a camera within the scene and capture an image at different times. This would capture the natural variability of a real scene. Another method is to capture a single image of the scene and specify possible changes that could be made to the individual elements and objects within that scene. An illustration of such a technique is shown in FIG. 7. Scene 801 is a representation of an original scene. Scene 802 shows the objects from scene 801 replaced with scene variability elements, such as shadows and other objects (for example, cars or birds—any object that can be placed within the scene). Scene 803, 804, 805, and 806 show different combinations of the original scene 801 with scene variability elements. One skilled in the art will appreciate there are uncountable different approaches to modifying a scene, such as using commercially available image editing software such as that marketed by Adobe Systems of San Jose, Calif., under the trade name "Photoshop." A few have been presented herein as non-limiting examples only.

Scene modification module 405 adds external variability to a scene, which will in turn result in multiple versions of the scene, or scene instances. The collection of scene instances, in one embodiment, captures the variability within the scene.

To measure the robustness of an object or the robustness of the scene, each scene instance is submitted to visual attention module 403 to produce a prediction as to where visual attention will be allocated within each scene instance (that is, to which objects). Information pertaining to each run is saved in database 407, then robustness assessment module 409 evaluates the data to generate statistics based upon objects to which the model predicted attention would be allocated, across these different instances (and as was described in further detail earlier).

Graphical user interface module 406 facilitates interaction with user 401. Graphical user interface module 406 may, for example, call on operating system resources (from computer system 408) to build a graphical user interface to solicit input from user 401. This input in one embodiment includes the location of the scene, as well as other operating parameters for the visual attention robustness assessment system. This input, in one embodiment, would specify regions and/or locations within the scene that user 401 is interested in evaluating. In addition to specifying such locations, user 401 could specify what types of variability is to be considered by the visual attention module 403. This may include general or specific internal variability, or general or specific external variability. For example, one specific type of external variability might be changing the image due to variations in lighting direction. As light changes, the shadows produced will change. This is a specific type of external variability because it does not consider other factors such as dynamic objects, atmospheric aberrations, and so forth. An example of general internal variability would be a condition in which the weights for each feature map are allowed to vary independently. An example of specific internal variability is when the weights of one set of feature maps vary (for example, brightness) but the others do not. Graphical user interface module 406 also facilitates getting input, possibly from the user, regarding from where images of the scene should be acquired. Possible locations include, for example, a database, or a flat file.

Robustness assessment module 409 controls the interaction of the other modules in order to evaluate the robustness of objects within a scene or the robustness of the scene itself. For example, the robustness assessment module 409 invokes the visual attention module 403 as necessary, as well as the VAM modification module 404 and the scene modification module 405. The manner in which the robustness assessment module 409 invokes the various modules may be modified by input from user 401, provided to the robustness assessment module 409 via, for example, graphical user interface module 406. Robustness assessment module 409 also evaluates data provided by other modules and generates reports as necessary.

Database 407 handles the data storage needs of the visual attention robustness assessment system 402. Among other things, database 407 may hold images of the scene. Database 407 may be any computer memory. It may be random access memory, or a flat file, or one or more database management systems (DBMS) executing on one or more database servers. The database management systems may be a relational (RDBMS), hierarchical (HDBMS), multidimensional (MDBMS), object oriented (ODBMS or OODBMS) or object relational (ORDBMS) database management system. Database 407, for example, could be a single relational database such as SQL Server from Microsoft Corporation.

User 401 is any user of the visual attention robustness assessment system. In some embodiments, the visual attention robustness assessment system 402 is easy enough to use that a person unfamiliar with visual saliency theory could use the system to evaluate the robustness of an object, region, or scene. User 401 may be a consultant hired by, or an employee who works for a commercial entity to evaluate positioning of signs and non-sign objects within their environment. User 401 may also be a content designer interested in evaluating the design and placement of a digital object (such as advertisement) on a web page in which the visual properties of the page may change.

Figure 8:
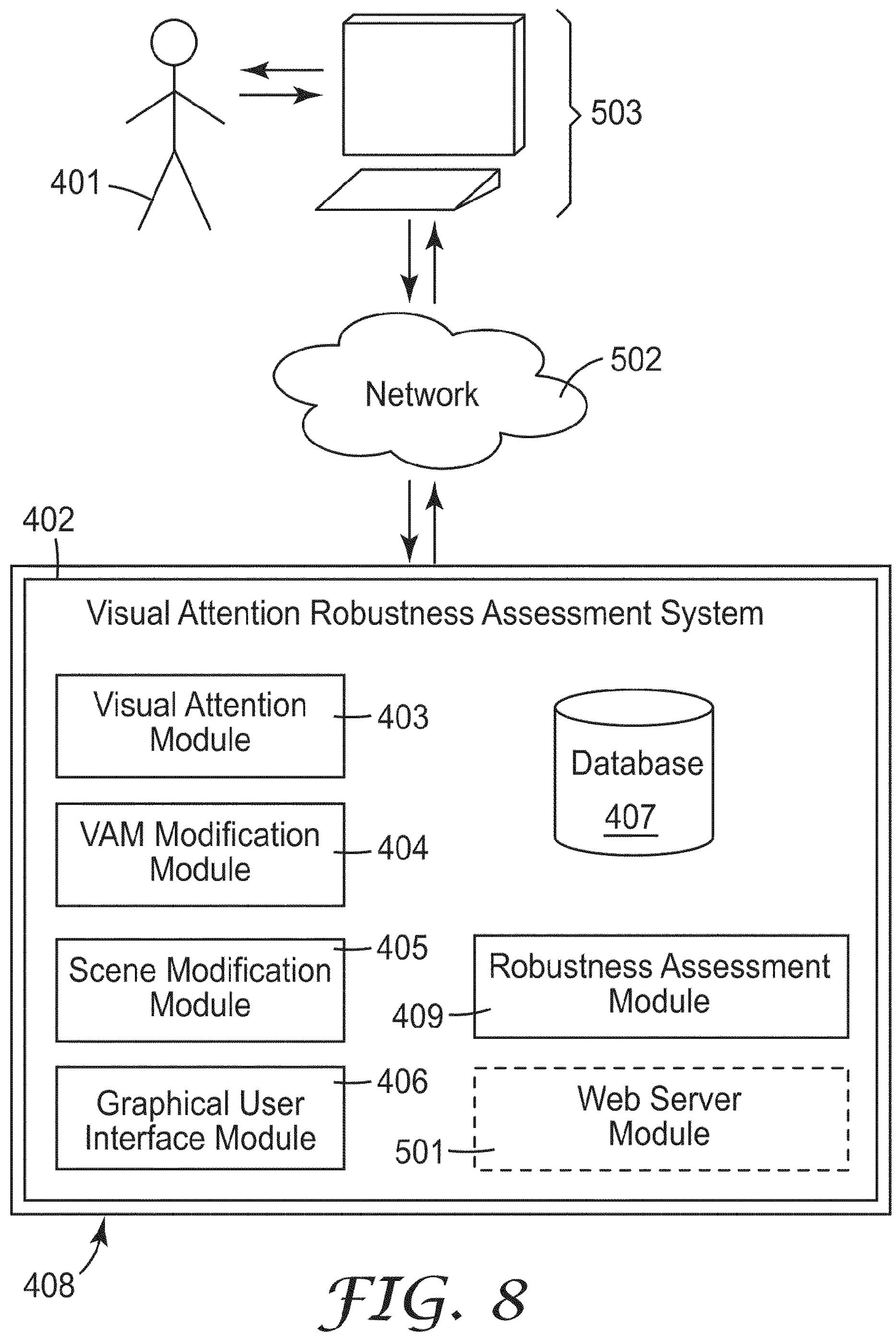
FIG. 8 shows an alternative embodiment of the visual attention robustness assessment system, in which the visual attention robustness assessment system additionally includes web server module.

FIG. 8 shows an alternative embodiment of the visual attention robustness assessment system, in which the visual attention robustness assessment system additionally includes web server module 501. Web server module 501 is shown, for convenience, as part of visual attention robustness assessment system 402. Web server module may, however, be embodied as a software module running on computer system 408, in separate memory space. Or web server module 501 may be on a separate computer system coupled, via network, to the visual attention robustness assessment system 402.

Web server module 501 provides an interface by which user 401 may communicate with visual attention robustness assessment system 402 via client computer 503 and via network 502. In one configuration, web module 501 executes web server software, such as Internet Information Server from Microsoft Corporation, of Redmond, Wash. Web server module 501 provides a mechanism for interacting with remote user 401 through the use of, for example, Active Server Pages, web pages written in hypertext markup language (HTML) or dynamic HTML, Active X modules, Lotus scripts, Java scripts, Java Applets, Distributed Component Object Modules (DCOM) and the like.

Although illustrated as "server side" software modules executing within an operating environment provided by computer system 408, the functional modules that comprise the visual attention robustness assessment system 402 could readily be implemented as "client-side" software modules executing on computing devices, such as client computer 503, as used by user 401. Visual attention robustness assessment system 402 could, for example, be implemented as Active X modules executed by a web browser executing on client computer 503.

Network 502 may be any kind of network, public or private. In one embodiment network 502 is the Internet.

User 401 in FIGS. 7 and 8 may be any user of the Internet. In one embodiment, user 401 may have pre-arranged, via a license, to access functionality of the visual attention robustness assessment system.

Figure 9:
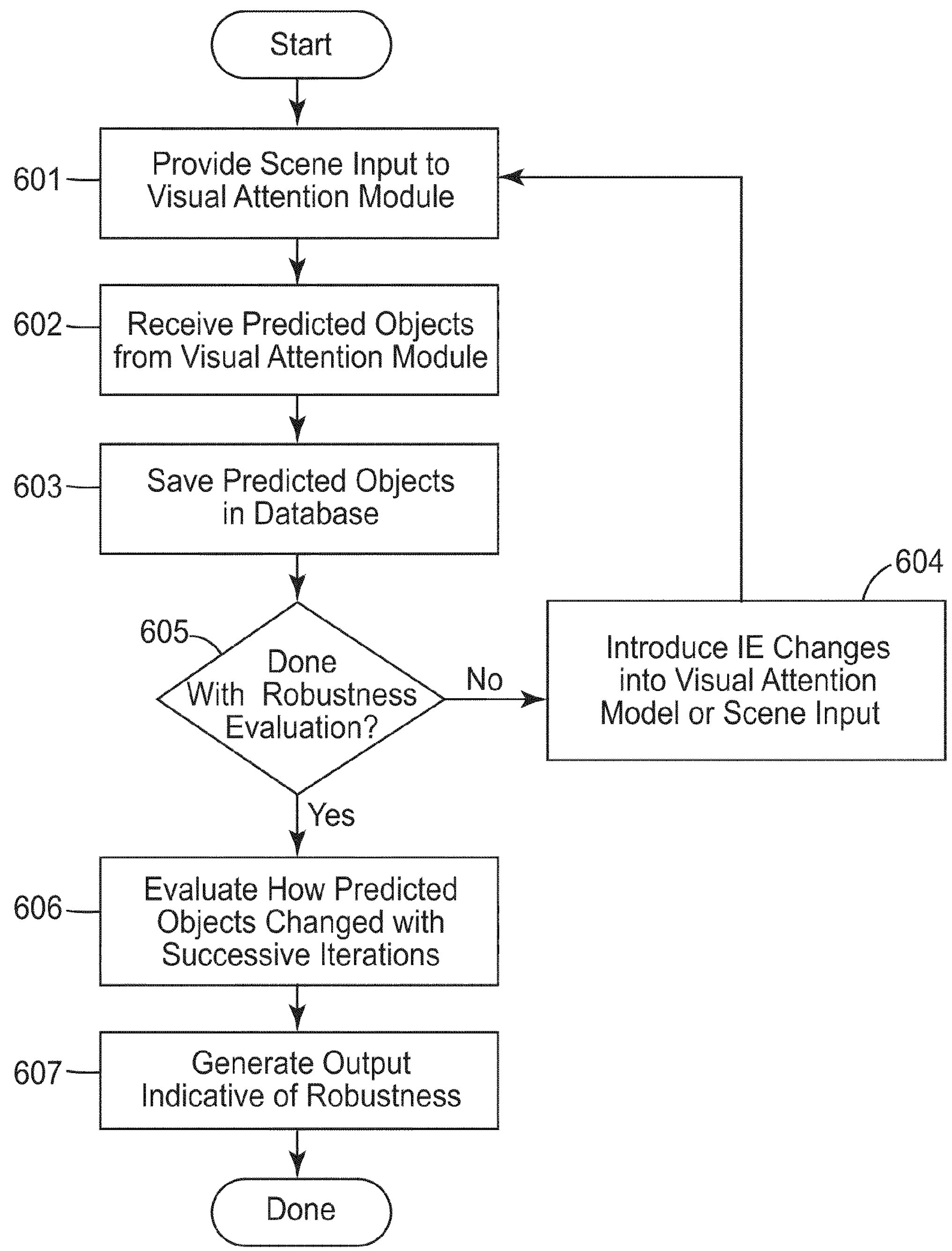
FIG. 9 is a high-level flowchart illustrating one embodiment of the process the visual attention robustness assessment system may employ to evaluate the robustness of an object within a scene or a scene itself.

FIG. 9 is a high-level flowchart illustrating one embodiment of the process the visual attention robustness assessment system 402 may employ to evaluate the robustness of an object within a scene or a scene itself. First, the visual attention module is invoked and provided scene input (step 601). Predicted objects from within the scene are then received from the visual attention module (step 602). Next, some indication of the locations/objects/regions that the model predicts to have high relative saliency is saved to a database (step 603). Precisely what will be stored in the database depends largely on the type of output received from the visual attention module in step 602. The database, in one embodiment, stores information about the objects that reached a threshold saliency value. In another embodiment, the database stores a matrix of values, one for each object identified in the image, and stores, for example, the number of times that the object reached a threshold saliency value. Next, a check is made to see if the process is complete (step 605). In one embodiment, this check might determine if the current iteration exceeds the number of iterations initially set by user 401. In another embodiment, the number of iterations may be determined by the algorithm. In yet another embodiment, the number of iterations may be determined by properties of the scene or statistics concerning the robustness measure. For example, if one were attempting to determine which of two advertisements would be better at a particular site, one could run the algorithm until there was a statistically reliable effect between the two advertisement's robustness values.

If robustness evaluation is not complete ("no" at step 605), IE changes will be introduced into either the visual attention module's visual attention model, or the scene input. IE changes may be divided into two categories: structured and random. Random variability is variability that is uncorrelated. For example, random variability in a scene might include random variations in the individual pixel colors and/or intensities. In such case, the pixel variations are uncorrelated. In contrast, structured variability has correlation between the elements being modified. For example, a scene modified by simulating the movement of an object within the scene, or adding or removing an object within a scene would constitute structured scene variability. In such case, the changes in the pixel modifications are correlated. Random internal variations might include random variations in the attention model used by the visual attention module. Structured variability, on the other hand, might be programmatic biases for attention in one part of the attention map over another. The types methods of generating variability are summarized in Table 1. The sub-processes that introduce IE changes are further detailed below.

TABLE 1

| | Internal | External |
|---|---|---|
| Structured | There are many ways to generate Internal Structured variability. This type of variability is defined by co-variation over maps or spatial regions. One method would be to vary the weighting of the different feature maps to the saliency map. The weighting values may vary slightly from one trial to the next, simulating an individual preferences or expectations of color, orientation, luminance, etc. Another method is to have the model bias one region of the saliency map (for example, lower hemisphere) in which all of the locations are given a saliency 'boost'. | Variability in the image in which collection of pixels co-vary. This co-variation can be generated by defining a region (or regions) within the image and modifying the RGB values within such region. All of the pixels within a particular region would be modified to the same degree. The amount of variation from region-to-region, or trial-to-trial may be set by the standard deviation of a Gaussian distribution. A second parameter might be the "size" of the region that can co-vary. |
| Random | Random variation is added to the output of the saliency map before the visual attention model determines where attention will be allocated. The variability could be in the form of any probability distribution, but the one example practice is to use a Gaussian distribution in which the mean of the Gaussian is set at the expected saliency value and the width of the Gaussian is set by an appropriate standard deviation. | Pixel-by-pixel variation in which the RGB values are randomly modified. The degree of modification may be specified by the standard deviation of a Gaussian distribution in which the mean of the Gaussian is set to the "true" RGB value. Other methods for variability can also be used. |

Once the IE changes have been made, the process returns to step 601.

Once the process is complete ("yes" at step 605), analysis is done on how, and the degree to which, the objects predicted by the visual attention module changed in successive iterations (step 606). This analysis is further described below.

Finally, output indicative of robustness is generated (step 607). In one embodiment, this output is provided to a user via graphical user interface module 406. However, the output may also be provided in other forms to, for example, other programs or calling functions.

Changes to the Visual Attention Model

One example of modifying the visual attention model (a type of change that could be introduced in step 604 in FIG. 9, discussed above) is to programmatically introduce a bias toward a particular feature within the scene, or a particular area within the scene. Such variability to the visual attention model will have an effect on where attention will be allocated and will simulate variability between observers and/or variability between human observers experiencing a scene from one time to another. As an example, one might use the lid and Koch bottom-up visual saliency model to evaluate visual attention robustness of a scene. With such a model, a saliency "map" is generated by combining the input from the different visual feature maps. For example, in some instantiations there are three feature maps: a first that is sensitive to color, another to orientation and a third associated with luminance The input to the saliency map is a weighted combination of these three maps. Typically, these three maps have equal weights into the saliency map indicating that there is no bias for one type of feature over another and can be represented as a weighting vector (for example, [1 1 1] for an equal weight of the three feature maps). One method for generating variability in the observer's biases is to modify these weights simulating a viewer that might be biased toward one feature over another. For example, one could bias the model toward brighter items in the environment by setting the weights to [0.5 0.5 2]. One method of generating internal variability (or simulating viewer variability) is to generate a collection of models that have different weighting values. This could be done by randomly setting the values for each model.

Another approach is to randomly modify the model's internal representation of the scene. For example, the neurons in the human visual system are somewhat noisy in that their activation will vary even with the presentation of the same image. Simulating this variability can be done by perturbing the internal representation of the values associated with the individual feature maps (for example, color, shape, orientation, brightness) a visual attention model develops in response to a scene.

Another method is to perturb the values in the saliency map that is used to identify which regions of the image are most salient. For example, one could perturb the internal representation following each fixation calculation, or perturb the values independently each time a scene is presented.

Changes to the Scene

The scene is changed by creating a new image using a graphical editor (e.g., Photoshop), 3D representation of a scene (for example, virtual reality model), or video (again, all collectively called "scene" herein), based on the previously existing scene in which the properties of the scene are varied. For example such varied properties could include simulated (or real) changes in lighting, or newly added or removed objects (real or virtual), or varying the pixel colors randomly.

There are many different ways to change a scene. Deciding what external changes to make can vary from situation to situation. One method for deciding what types of changes to make to a scene is to determine the types of scene variability that typically occur within the scene and introduce those changes to the images that are analyzed. For example, in a hotel lobby people will be moving through the scene. Sometimes the guests will be standing at the counter, sometimes standing at the elevator, or walking from one place to another. Simulating these situations provides a method for capturing the variability in the actual scene.

One may want to vary and/or measure the degree to which the external variability is added to the scene. One method for quantifying the degree of external variability is to vary the number of objects manipulated in the scene. For example, returning to the hotel lobby example with pedestrians, one may vary the number of pedestrians in the scene. Few pedestrians would translate to a small amount of variability while a large number of pedestrians would translate to large variability. Another method for measuring variability is to measure the pixel variation for all of the images that are generated. One example measure of pixel variability is to measure the average variance of each pixel for the set of images that are generated. Once the variability of each pixel is calculated, a single number could be produced by computing the mean variance of all of the pixels. Again, as the variability of the within the image increases, this value will also increase.

One method for generating changes is to make changes to an image by digitally modifying the image using commercially available image editing software such as that marketed by Adobe Systems Inc. of San Jose under the trade name "Photoshop." Using this method one can modify the scene by digitally placing objects, removing objects, or simulating lighting changes. These changes would then be translated into a collection of images that would be read and analyzed by the model. These changes can also be applied to images automatically by superimposing layers onto images algorithmically.

Another method for generating external structural variability is to generate virtual representations of the scene. Using this approach one can easily modify the locations of objects, object properties, and lighting conditions. From these virtual representations, images can be generated in which the objects, their properties, their poses, and lighting conditions have been changed.

Thus far, approaches to changing the scene could be said to be "synthetic"—that is, they are changes to representations of the scene, rather than to the scene itself. Another approach to modifying the scene is to modify the actual scene. For example, one could take a series of time-delayed images (for example, a picture every 300 seconds for a defined period). This series of pictures could then be used for successive iterations of the visual attention robustness assessment system. Such analysis (multi-image across time) would provide a measure of the external structure variability. Furthermore, given such variability (people and objects moving, along with changes in lighting direction due to changes in, for example, the sun's position) one could analyze where attention will typically be allocated within the environment.

In addition to adding external and internal variability "blindly" one could also introduce variability that is dependent upon the visual saliency of the different objects in the scene. For example, one may want to decrease the degree of variability where attention is allocated and increase it for those regions where attention is not allocated.

Evaluating Robustness

There are a number of methods for characterizing the robustness of a scene, such as using a "heat map" graphical representation, an internal entropy value, a robustness index, or robustness value. One basic approach to summarizing the integrated results from repeatedly applying a visual attention model to a scene, while for each iteration applying some type of IE change, is to generate a graphical representation of the relevancy values or regions that are overlaid onto a representation of the scene. Such an approach yields something akin to a heat map, with "brighter" objects being more robust to the variability in question.

In addition to evaluating the effect of noise on which objects a visual attention model predicts, another method for evaluating robustness is to measure the variability in the model's internal representation of the scene. For example, the Itti & Koch model uses an internal "saliency map" representation to determine the locations that visual attention will be allocated. One could (but not the only method) measure the amount of change, or entropy, in this internal representation of the saliency map as a function of IE changes, as a metric for robustness. One could also look at the responses of the individual feature maps, or other internal representation of a visual attention model to measure the effects of IE changes.

Another method for generating a robustness metric is when the IE changes can be parameterized. This would be the case, for example, where one adds random luminance noise to the scene (thus changing the amount of noise by modifying the luminance energy of the noise relative to the luminance energy in the image). Or one could increase the variability of the connection weights of the visual attention model and characterize the degree of change as a measure of entropy. Another method for characterizing the robustness of an object, group of objects, or scene is to determine the amount of noise that these objects can tolerate while retaining their visual saliency hierarchy. The method for this metric is to measure the likelihood that an object will be attended as a function of the amount of variability generated. Those objects and/or scenes that are highly robust will tolerate large amounts of noise before attention begins to be attracted to the noise elements and not to the objects/regions. The resulting metric would be the level of noise that the object could tolerate before attention was drawn away from the object and toward the noise.

Figure 4:
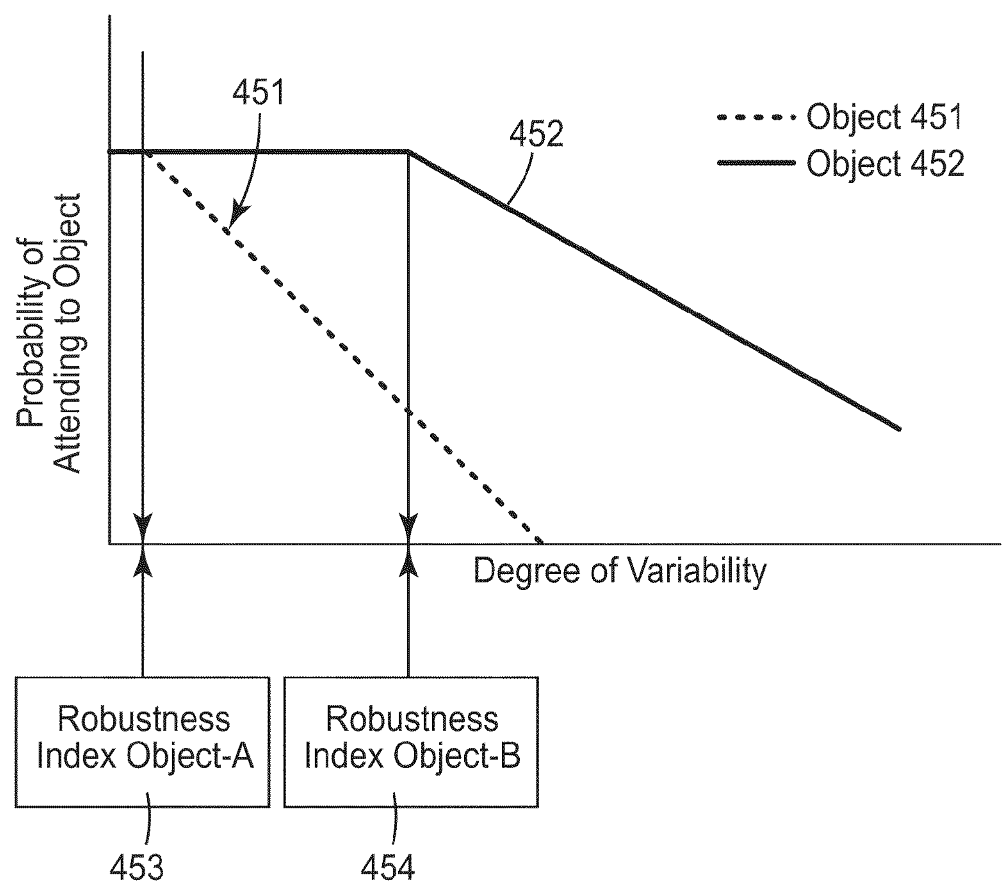
FIG. 4 is a graph showing properties of two example objects.

FIG. 4 is a graph showing the probability of attending to an object versus the degree of variability for two objects, the first object 451 having a low noise tolerance (low robustness value) and a second object 452 having high noise tolerance (high robustness value). The graph shows the effect of variability on whether attention will be allocated to object 451 and object 452, each with different respective robustness indexes. In this example, adding a small amount of variability significantly affects the probability that the model will predict that attention will be allocated to Object 451. This is illustrated in FIG. 4 by the drop in probability with only a small amount of variability. By contrast, Object 452 is unaffected by small amounts of variability. This is illustrated by a "Drop-off" point occurring with a much greater level of variability. By measuring these "drop-off" points one can quantify, in terms of a robustness index, different objects within a scene.

Rather than, or in addition to, the heat map approach just described, it may be useful, at times, to quantify the robustness of a particular object (or plurality of objects) within a scene. Such quantification may allow for subsequent analysis such as determining the degree (or the robustness index value) of IE changes that begin to reduce the degree of saliency of a particular object within a scene.

It may also at times be useful to evaluate and/or quantify the robustness of the scene itself. This distinction between object and scene robustness opens the door to many types of interesting subsequent analysis. For example, it is possible that a scene has a low robustness value (that is, the set of objects that the model predicts will receive visual attention vary as a function of IE changes) while an object within that scene has a high robustness value. An example of a "high" object robustness value and a "low" scene robustness value would be, for example, when the target object is always in the top three attention fixations, but the other objects being considered vary significantly.

Table 2 provides exemplary data in which a target object has a high and low robustness value crossed with scenes that have low and high robustness values. In this table, one possible robustness metric is shown in which a normalized likelihood value, called a Robustness Value below, is calculated for each object. For each scene the left column indicates the percentage of time that the object appeared in the first three saccades when there are IE changes. In the example shown in Table 2, there are 14 objects within the scene, one target object and 13 distractors, distractors being non-target objects or regions having saliency. If the model were to choose three objects randomly, each object would have a 21.42% chance of being selected (3×1/14=0.2142). This would be the condition in which there is very little object and/or scene robustness, and thus it serves as an important baseline by which to compare the robustness of the scene. This is because robustness declines as probability approaches that of chance. In this example, the Robustness Value is mathematically the % Attended divided by the % chance of being selected, thus the first Robustness Value of 4.6667=100%/21.42%. One method for calculating a robustness value for the scene is to calculate the average robustness value for the top K objects (number of attention selections). At the bottom Table 2 is the average robustness value for the top 3 objects.

TABLE 2

| | Robustness | | | | | | | |
|---|---|---|---|---|---|---|---|---|
| | Target Object = High Scene = Low | | Target Object = High Scene = High | | Target Object = Low Scene = High | | Target Object = Low Scene = Low | |
| Object ID | Attended | Robustness Value | Attended | Robust Value | Attended | Robust Value | Attended | Robust Value |
| Target Object | 100% | 4.6667 | 100% | 4.6667 | 5% | 0.2333 | 9% | 0.4200 |
| Distractor_1 | 15% | 0.7000 | 90% | 4.2000 | 97% | 4.5267 | 30% | 1.4000 |
| Distractor_2 | 15% | 0.7000 | 5% | 0.2333 | 5% | 0.2333 | 26% | 1.2133 |
| Distractor_3 | 17% | 0.7933 | 2% | 0.0933 | 2% | 0.0933 | 15% | 0.7000 |
| Distractor_4 | 14% | 0.6533 | 80% | 3.7333 | 88% | 4.1067 | 32% | 1.4933 |
| Distractor_5 | 13% | 0.6067 | 3% | 0.1400 | 91% | 4.2467 | 28% | 1.3067 |
| Distractor_6 | 21% | 0.9800 | 2% | 0.0933 | 2% | 0.0933 | 22% | 1.0267 |
| Distractor_7 | 18% | 0.8400 | 1% | 0.0467 | 1% | 0.0467 | 32% | 1.4933 |
| Distractor_8 | 19% | 0.8867 | 4% | 0.1867 | 4% | 0.1867 | 33% | 1.5400 |
| Distractor_9 | 16% | 0.7467 | 2% | 0.0933 | 2% | 0.0933 | 38% | 1.7733 |
| Distractor_10 | 20% | 0.9333 | 1% | 0.0467 | 1% | 0.0467 | 18% | 0.8400 |
| Distractor_11 | 14% | 0.6533 | 2% | 0.0933 | 2% | 0.0933 | 17% | 0.7933 |
| Distractor_12 | 18% | 0.8400 | 8% | 0.3733 | 8% | 0.3733 | 9% | 0.4200 |
| Distractor_13 | 19% | 0.8867 | 0% | 0.0000 | 0% | 0.0000 | 30% | 1.4000 |
| Scene Robustness Value | | 2.1933 | | 4.2000 | | 4.2933 | | 1.6022 |

Table 2 categorizes the locations where attention is allocated, by objects. But as mentioned before, the term object is loosely defined as a region or area in an image (or scene). The methods and systems described herein are not limited, however, to an object-based approach—other, similar approaches would also work. For example, a grid could of equal size regions could be defined over the scene, or regions of the scene defined based upon properties of the human visual system (for example, the size of the fovea of the viewer).

Assessing Across Scene Robustness

Figure 5:
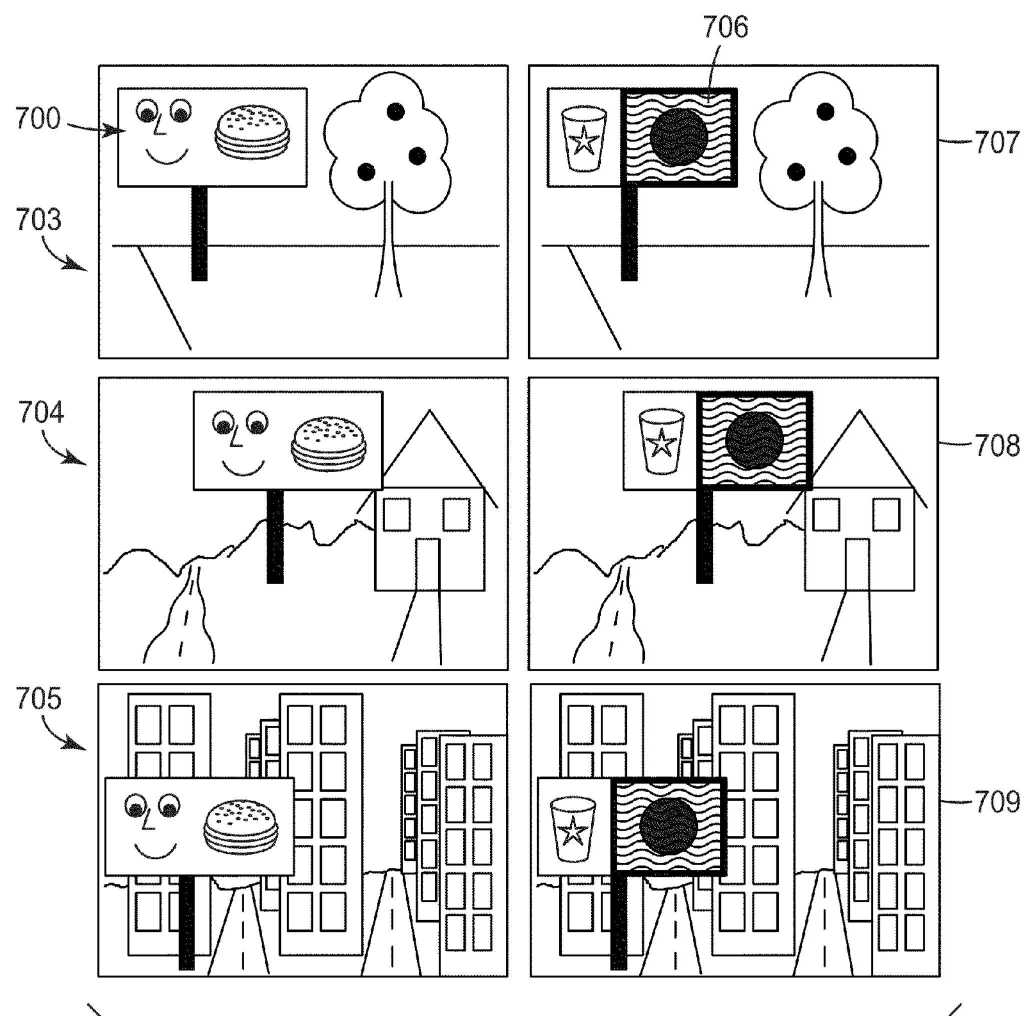
FIG. 5 shows how a billboard object can be set against different background scenes.

Given the above methods for evaluating the robustness of an object or a scene, it is next possible to extend the evaluation of robustness in other ways. For example, "across scene robustness" is a measure of how the robustness of an object (or a group of objects) changes across different scenes. By providing a robustness metric for an object (as discussed above), separate from the scene, one can evaluate the robustness of a particular object in different scenes. For instance, consider the situation in which an advertiser is deciding between two different pieces of advertisement content that will be placed on three different billboard signs that are in three different scenes. FIG. 5 provides an illustration of an example of this scenario. Scene 703 includes billboard 700. Billboard 700 repeats in scene 704 and 705. Similarly, billboard 706 is seen in scenes 707, 708, and 709.

Using methods described earlier (for example superimposing the advertisement content in a graphical representation of the scene) one can determine a robustness value for each billboard in each of the three scenes—generating six different object robustness values. The customer may then select the advertisement (object) that has the highest average robustness value (or other metric based upon the collection of robustness values).

One can also use similar analysis when one has a set of objects but needs to select from a set of scenes in which to place the object or objects. If we continue with the billboard advertising example, the customer may have a single advertisement that they want to place in two of three different scenes. One can employ the techniques described above to generate the digital images that can be used to generate the robustness value for each advertisement in the three different scenes. To facilitate the scene selection, the customer could choose the two scenes (with the advertisement superimposed within the scene) that have the highest robustness values.

In addition to selecting a single object (for example, advertisement billboard) from a collection of objects for a fixed set of scenes, or a set of scenes (from a collection of scenes) for a single object, one could also assign objects to specific scenes based upon a robustness value. For example, a customer might have three different advertisements (the content that is placed on a billboard) that they have developed and twenty different billboards that these signs could be placed upon. By generating robustness values for each of the three advertisements placed in the twenty scenes, the customer could then choose to use the advertisement that has the highest robustness value for each individual scene. Additionally, one could assign the best advertisements to the ten scenes with the highest robustness value.

Although the examples thus far illustrate how a robustness metric could be used to improve choices made with regard to billboards and advertisements, the benefits of a robustness metric are not limited to this domain, and could be used in any domain in which one has a collection of contexts (scenes) and a collection of visual stimuli (objects) to select between, such as digital signs within a store or hotel, static signs, product signs, product packaging configuration, or web sites.

Note that the systems and methods described herein for evaluating the robustness of objects within a scene, or the robustness of a scene itself, are not dependant on any particular methodology for determining visual attention. Rather, they can generally be used with any model for assessing visual attention, and in some embodiments multiple different visual attention models may be used for evaluating robustness of an object or a scene.

Robustness and Attentional Fixation Sequence

The discussion up to this point has mostly focused on the robustness of an object in a scene or the robustness of the scene or a collection of objects within the scene without consideration of the order in which the objects are attended to. For example, analyses up until this point have evaluated only whether or not the model actually predicted that attention was allocated to the object or not. There are, however, situations in which the order of the elements actually does matter. For example, for a multi-object scene, one may want to know how often one object appears before another object, and whether there are intervening objects that are attended to in between the attention to two separate objects (so-called intervening objects).

Using the methods described above related to introducing variability to a scene one will have available to them a collection of attention fixation sequences. Using this data one can identify all of the sequences in which the target order (for example, attending to Object-A before Object-B) is achieved. A sequence robustness analysis could use the probability of achieving the target sequence as a measure of sequence target robustness. One example method for measuring sequence target robustness is to compute the likelihood that the target order (that is, Object-A before Object-B) would occur if one were to randomly select the objects. The sequence target robustness value would be the probability that the target sequence was achieved divided by the likelihood that it occurred by chance. The principles behind this metric are similar to the principles behind the robustness value described above.

Considering a first case where the relative order of attention does matter, but intervening objects do not. The objective is to have attention drawn to Object-A before Object-B, as would be the case for example where a company is advertising a dinner special for a restaurant on a billboard near the restaurant itself. The company may be considering two discreet advertisements the dinner special. The goal is to get people who are passing by to first attend to the dinner special advertisement followed by attending to the restaurant itself. Using the methods described above to evaluate the two different advertisements (that is, digitally inserting the advertisements in a digital image so they appear as if on the billboard), as positioned within the scenes they will be placed) then applying IE changes, one can calculate how often the billboard receives visual attention before the restaurant. Tables 3 and 4 provide possible likelihoods showing the relative ordering of Object-A and Object-B along with whether they received attention at all (Object-# Not Att.). From these tables we see that Object-A before Object-B occurred 65% of the time with Advertisement Content-1 but only 40% with advertisement Content-2. Thus, if this sequence was important the customer might be inclined to choose Advertisement Content-1.

TABLE 3

| Advertisement Content-1 | | | |
|---|---|---|---|
| | Object-A Pos 1 | Object-B Pos. 2 | Object-A Not Att. |
| Object-B Pos. 1 | | 25% | 7% |
| 2. Object-B Pos 2. | 65% | | |
| Object-B Not Att. | 2% | | 1% |

TABLE 4

| Advertisement Content-2 | | | |
|---|---|---|---|
| | Object-A Pos 1 | Object-B Pos. 2 | Object-A Not Att. |
| Object-B Pos. 1 | | 20% | 20% |
| 2. Object-B Pos 2. | 40% | | |
| Object-B Not Att. | 5% | | 15% |

Robustness and Multi-Sample Conditions

The discussions thus far have focused when observing an object from a single location. However, the world is highly dynamic, and often times the observer is moving through space. As the observer is moving through space, the observer can have multiple chances to "process" a particular object. However, this movement generates another important aspect to the robustness analysis which is the amount of time, or the number of fixations, in which an object will be visible, can vary. We will refer to this as the visibility duration—how long a particular scene or object is visible by an observer. One method for capturing the visibility duration is by using a model that reports a predicted sequence of visual attention locations. With these models the visibility duration can be specified by limiting the number of fixations that the model considers for the robustness evaluation for the scene (this also applies to scene optimization, discussed below). Longer visibility durations correspond with more fixations, while shorter visibility durations would correspond to fewer fixations. Changes in the visibility duration can have a significant effect on the robustness analysis.

When the number of fixations that can process a scene is limited, whether an object will receive attention or not will depend on where it is in the visual attentional sequence. For example, a customer may place a digital sign within a hotel. The digital sign is presenting two pieces of content—one after the other. One piece of content is presented for 3 seconds and the second for 6 seconds. Given its limited visibility duration the 3-second piece of content needs to appear earlier in the attentional sequence than the 6-second piece of content. If for example, people make 2 fixations per second, the model has to predict that attention will be drawn to the object in the first six fixations. By contrast, the 6-second piece of content has to receive visual attention in the first 12 fixations. Given these dynamics, and others like them, not considering visibility duration can lead to inaccurate predictions about the objects that people will attend to in a scene.

To illustrate this, we will extend the billboard example (but this same concept applies to any display that is dynamically changing). Let us consider a long straight road in which there are multiple signs along the road. Furthermore, the road is flat and there are no other objects other than the billboards. Under these conditions all of the billboards would have the same visibility duration. That is, the amount of time that the visual system processes any particular billboard is the same and will be determined by the speed of the car, the size of the sign and any atmospheric aberrations in the scene.

Let us now consider this same road in which there is a row of trees 500 feet in front of one of the last billboard on the road. All of the other billboards would have equal visibility durations, but this final billboard would have shorter visibility duration. Given this change in the visibility duration one would want to limit the number of fixations that the model would consider for the robustness evaluation. The first set of billboards might have a high number of fixations, while when considering the duration for the final billboard one might consider fewer frames from a movie or fewer fixations in an image.

This aspect of visibility duration can play an important role when one considers the situation where there are multiple objects within a scene. Under some conditions one may want to distribute the attention capturing elements such that the objects are salient enough to be processed (or capture attention) but not so salient that they distract from other objects within the scene. (Note: this concept also relates to scene optimization, which concerns modifying a scene in a way that achieves particular goals. Scene optimization is discussed further below.) Given this, one would want to consider the visibility duration when analyzing the robustness of an object, a collection of objects or a scene. For example, for an object that has a short visibility duration on a path, one may want to increase the saliency elements (for example, motion, brightness, color contrast, etc.) to increase the likelihood that a particular object will be processed during that short visibility duration. However, for another object that is visible along that same path, but has a longer visibility duration, one may be able to take advantage of the fact that there are more opportunities to process that object and thus one can allocate fewer (or weaker) saliency elements to that object.

The visibility duration would be factored into the robustness analysis by considering whether the object received visual attention anywhere along the path. Thus particular objects that have longer visibility durations than others would have more attentional fixations associated with them, and if attention was allocated to the object anywhere along that sequence then it would be considered a "hit." Therefore, objects with longer visibility durations would have more samples and would have a higher likelihood of being processed and thus may require a lower level of saliency to be processed. An object with shorter visibility duration would have fewer samples and thus would be less likely to be attended and thus, may require higher level of saliency elements to be detected during that shorter sequence.

Scene Optimization

Up until this point, the disclosure has focused on robustness. Now we turn to other visual attention modeling related concepts that, in some embodiments, may benefit from the robustness-related methods and systems described earlier, but do not necessarily require assessment of robustness. One such related concept is that of scene optimization.

As discussed earlier, visual attention models exist that may predict where a subject will allocate his or her visual attention within a scene. However, such models do not provide any mechanism for identifying how a scene can be modified to achieve a specific visual goal. Because a human's visual system does not actually process the entire viewable area of a scene, but instead only processes those regions in which attention is drawn, it is desirable in many real-world situations not only to get people to 'view' specific objects within a scene, but to have them 'attend' to specific objects.

A visual goal, then, refers to the desired manner in which a subject will attend to objects within a scene. For example, a visual goal could be simply a desire that particular objects are attended to (that is, the collection of objects within a scene that one determines as important (from a visual attention perspective) in addition to the collection of objects that are deemed unimportant or even detrimental. Or, it could be a desire to have particular objects attended to in a particular sequence or at a particular time, or it could be a desire to have particular objects attended to from a particular viewing point, but not necessarily from others. The remainder of this section discusses ways in which one could utilize a computational model of visual attention to optimize a scene in order to achieve a visual goal. Some of the methods that will be discussed utilize an assessment or robustness, as discussed earlier, but some do not.

Figure 10:
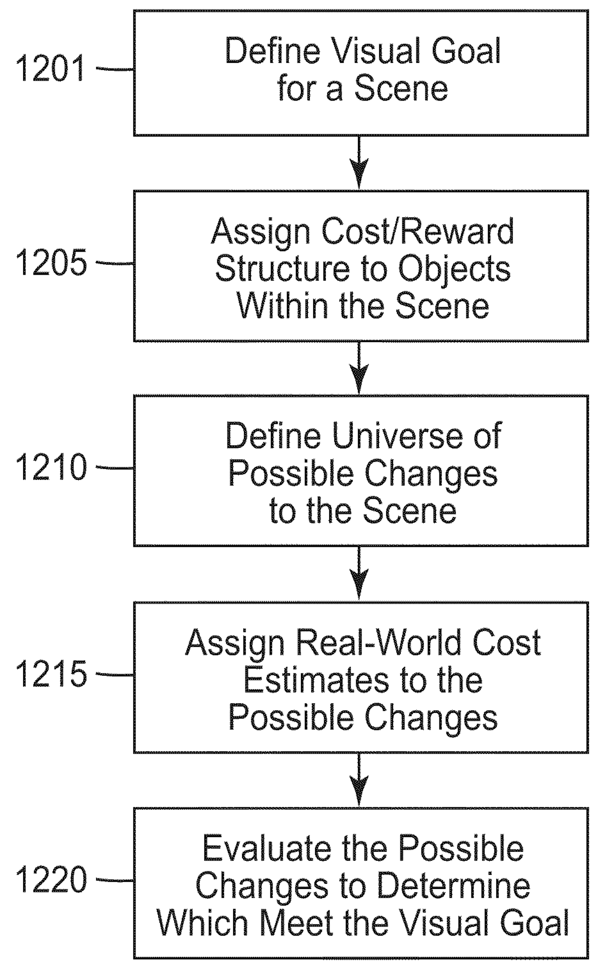
FIG. 10 is a flowchart showing the high level process of scene optimization.

Referring to FIG. 10, once a visual goal has been defined (step 1201), scene optimization starts by assigning an explicit cost/reward structure on the objects within the scene (step 1205). Such assignment defines, quantitatively, the visual goal. The cost/reward structure defines which objects within the scene are high value objects, low value objects and even objects that the user views as distracting or detrimental to the visual goal. The user will place "attention utility" values on to each of the objects that are deemed to be part of the visual goal (positive rewards) or are detrimental (negative costs). Or, the user can place priorities specifying which elements are "more" valuable to the visual goal than others.

Next, a number of possible changes to the scene are defined (step 1210). These could be simple changes such as lighting, color of objects, positioning of objects, etc. or more complex design changes such as where within a lobby a reception area should be built. Of course, ideally, the time to evaluate something as fundamental as positioning of the reception area is best done before building a hotel lobby, so it is expected one utility of the scene optimization methods described herein will be for evaluating synthetic, or partially synthetic, scenes and design/layout choices within such scenes.

The actual real-world "cost" (or estimate) is then associated with each possible scene change (step 1215). For example, in the case of a hotel lobby, where the goal is for patrons to attend to a particular sign, changing the color of the sign may be relatively inexpensive (could be assigned an estimated change value of $200), while changing the color of the granite floor would be expensive (could be assigned an estimated change value of $20,000). Assigning real-world cost estimates makes it possible to associate a price figure with a plurality of changes. For example, a range of possible changes to a scene could be considered, some of which meet all goals, some of which meet most goals, some of which meet goals and do so the most inexpensively, and others of which meet 90% of the defined goals, and to achieve the other 10% of goals, it may be found it takes a disproportionate investment capital. In other words, associating real-world costs with possible changes may, in some embodiments, allow for a much more useful assessment of options. In the end, the method provides the scene configuration that maximizes the attentional utility while minimizing the cost associated with the object feature configurations (step 1220).

Note that real-world costs are just an example of how relative costs of particular changes could be co-associated—other systems, such as point systems with higher points correlating with higher costs for particular changes, and lower points being less expensive changes, could just as easily be used.

A graphical editor with the ability to track and manipulate discrete objects may be useful in defining possible changes to a scene. For example, a sign in a scene that is being viewed within such a graphical editor could be identified (right-clicked with a mouse, for example), and the user would be able to select the changeable properties of that object. These changeable properties might include color, lighting, positioning within layers (for example, the object could be put in front of or behind some other object), contrast, shadow, size, etc. In addition to selecting the individual properties that may be changed, the user may also have the ability to define the allowed scope of change or other relevant parameters. For example, with respect to color, the only colors a client or user may find acceptable for a particular wall that is within a scene may be shades of tan. Thus the color attribute is defined to only be varied within the specified spectral range. Similarly, if the attribute is size, there may be an obvious limit to the size a particular object may grow to (or be reduced to) before the size of the object is not acceptable to the client or user. As mentioned earlier, the real-world cost estimate is associated with each possible change. Where there is a range of possible changes, a user may define the cost of exemplary points within the range and the supporting computer system (later described) will extrapolate a best-fit curve for the example points. The user may be presented with a number of possible best-fit algorithms and thus be asked to select which one to use. For example, the user may just want to define, with respect to the size of a sign, that the smallest allowable sign costs $100, and the cost of the intermediate signs increase linearly (based on size) between these two cost points.

With goal (or plurality of goals) defined, the attentional utility for the goals, the possible scene changes, and the costs of the possible scene changes defined, the next step is to evaluate the benefit of possible changes to the scene and attempt to find the scene configurations that achieve the visual goal defined in step 1201. This is done, in one embodiment, by algorithmically modifying properties of the scene to maximize the expected reward, or the scene configuration that minimizes costs while maximizing rewards, or the scene configuration that simply meets the defined goals for the least cost. The expected reward is calculated as the likelihood that a particular object will receive attention and the reward/cost for attending to those objects. In addition to the reward/cost for attending to the location in the scene, the optimization routine also factors in the cost/reward for making specific types of changes to the scene (for example, changing the color and/or position of an object within the scene). One method for calculating the likelihood of an object receiving attention may be determined using the robustness analysis described in the previous section.

Equation 1 provides one example of how to formulate a utility function using a computational model of visual attention.

$$ER(F) = \sum_{a_F \in A_F} [a_F(xy) R_a(O_f(xy))] + \sum_{o \in O} R(o_f) \qquad \text{Equation 1}$$

F is the set of changeable attributes for the objects within the scene. For example, it would include the color, texture, or position for each of the objects within the scene. A is the set of attentional fixations that the model predicts given this feature configuration F. R(Oxy) is the reward (both positive and negative) for attending to the object at the position (xy) with the feature set f. a(xy) is the likelihood that the model predicts that attention will be allocated to location xy. For some models and approaches of visual attention a(xy) can be a binary value (0 or 1 indicating whether attention will or won't be allocated to the location), while for other models and approaches, this might be a likelihood that attention will be allocated to this location (0 . . . 1). Either way, this part of the equation specifies the reward for the allocation of attention for the current object feature set.

The other part of the function specifies the cost for using feature set f for object o. $R(O_f)$ specifies the reward/cost for using feature set f on object o. In some cases the cost for a particular feature might be 0.0 (for example, this might be the case for the current feature set for object o). However, one may want the model to consider all possible feature combinations being equally difficult. In this case the rewards for all features would be equivalent (or most easily 0.0). However, in some situations (for example, changing the color of the carpet in a scene versus moving a vase) there will be constraints on the allowable feature configurations. In such situations, one could specify these values in terms of costs/rewards on the object (o) and the features (f), or they could simply refrain from defining the non-allowable feature configurations as an allowable change.

Using this reward function, the solution space is explored for a feature configuration that optimizes the stated reward function. There are a number of methods for achieving the optimal solution once the reward functions are specified. These methods include, but are not limited to, using closed form equations, Monte Carlo Simulations, Simulated Annealing, Genetic Algorithms, and Stochastic Gradient Descent. In addition to these approximation approaches, for some visual attention models, one could implement a closed form analysis.

The solutions from the solution space that meet the goals, and associated cost information, is then available to be evaluated.

Note that many of the examples thus far focus on optimizing a scene by increasing the visual saliency of objects within that scene. Note, however, that some visual goals may be achieved by reducing the visual attention (or distraction) from other objects. The scene optimization method described herein, depending on how the cost model has been set up, may result in muting aspects of the scene (not always making the objects more visually salient).

Scene Optimization and Attention Sequence

As mentioned above, some goals may not consider the order in which objects are attended to. Under such conditions, the reward/cost for attending to an object will be unaffected by either its position in the sequence and/or the objects that were attended to before or after a current attentional fixation. However, there are situations in which the attention fixation order of objects within a scene may be important. For example, order tends to matter when a subject is following a specific sequence of instructions.

Figure 11:
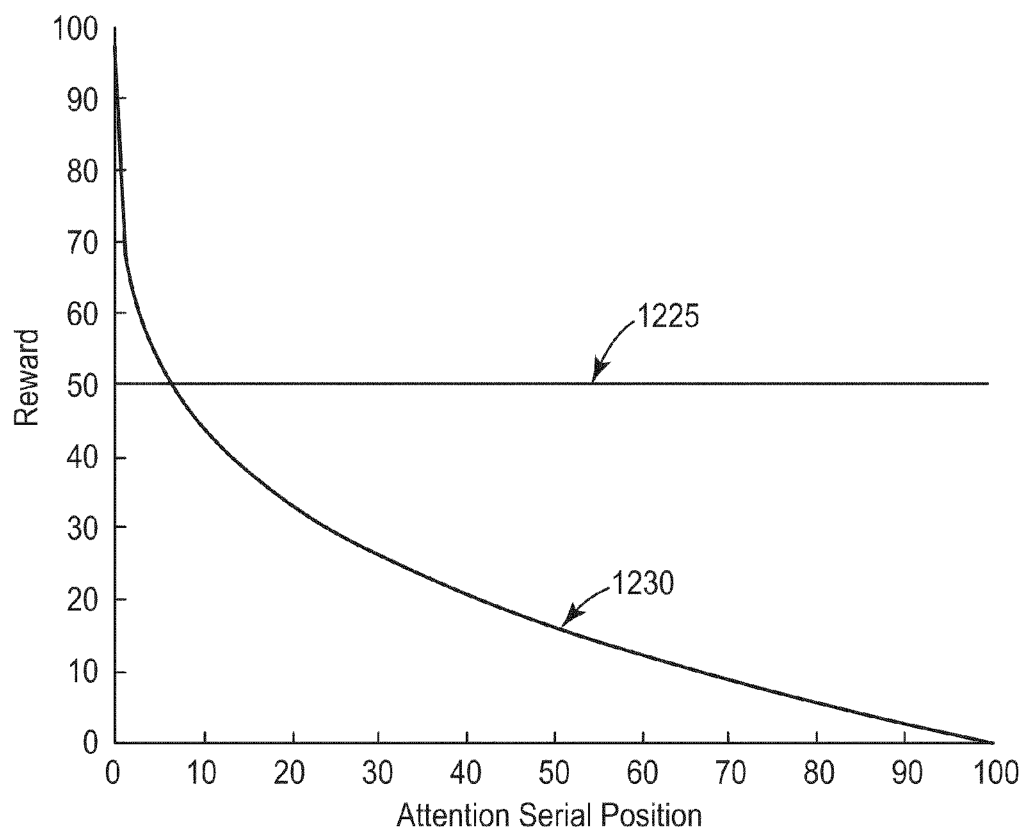
FIG. 11 is a graph illustrating two different reward structures as a function of the serial position of the attentional saccade to the object of interest.

To deal with this more complicated visual goal, the expected reward function above (Equation 1) may be expanded to optimize the feature configuration such that the expected reward is order dependent. This can be done by taking advantage of a variable reward structure as a function of saccade number. Note that in Equation 1 the reward for attending to an object is indexed by the individual attentional saccade (Ra). By specifying a different reward based upon the saccade's sequential position (a) one can generate a method by which the scene is optimized by the predicted saccade order. FIG. 11 is a graph illustrating two reward structures. One reward structure is represented by invariant with saccade position (line 1225) and the second is dependent upon saccade position (line 1230). The saccade dependent reward structure specifies that the expected reward for attending to this particular object is very high if it occurs early, but it declines as attention is allocated later in the sequence. This type of reward structure might be associated with "high value" objects, such as pedestrians in a construction zone scene.

Rather than basing a reward on how early the object is attended in the attentional sequence (as FIG. 11 illustrates), one could also base the reward on a sequence-based goal, where an object's reward is based on the objects that have received attention before it and after it. For example, a hotel owner may have two outdoor signs. One advertises a special in their restaurant and the second displaying the name and logo of their hotel. The hotel owner decides that it is important that the advertising special sign should be seen before the hotel's sign. Given this visual goal the analysis would place a very high reward on when the "restaurant special" sign is attended to before the hotel name. Furthermore, a low reward would be given for when the hotel name is attended to before the "special advertising" sign and no reward may be given if either one is attended without the other. The sequence could be a relative sequence (before versus after) or could be an absolute sequence (no reward for attending to objects A and B unless Object-A occurs as the first object that receives visual attention and Object-B is the second object that receives visual attention). There are, of course, many other ways in which reward structures could be formulated, as will be appreciated by a skilled artisan.

Thus far this section has discussed two possible reward functions in which the position of the saccade or the order of the saccades affects the reward. One skilled in the art will recognize one may define any arbitrary sequential reward function over the set of objects and the set of saccades. More generally one can define this sequential component of the reward structure by defining an M dimensional space (one dimension for each object) that is the length of the saccade sequence in question.

The optimization routine may be set up to provide the best configuration for a scene given the reward structure, but one may find that the resulting scene "recommendation" not appropriate. For example, one might wonder how the attentional sequence changes if one were to modify the color of one object to make it more, or less, conspicuous. Making one object more conspicuous can have non-obvious, non-linear effects on the predicted sequence. This is due to the fact that attention allocation is by definition a zero-sum game: allocating attention to one object will necessarily mean that attention is allocated away from another object. Thus modifying the features of one object to increase its conspicuity will not only change the likelihood that this object will receive attention (and where in the attentional sequence it will receive attention) but it will also affect the likelihood that other objects will receive attention and where in the attentional sequence those objects receive attention.

Because one approach to the optimization routine is to automatically consider multiple feature configurations, many (or all) of the possible configurations that define the solution space will have been explored. The non-optimal solutions could be of great interest to a user or a client. For example, one might want to know what color to make a sign to move its position from, say, the $25^{th}$ position in the saccade sequence to the top 5. The system could look through the stored attentional sequences in which the features of all the other objects are held constant and the object of interest falls in the top 5 saccades.

Robustness, discussed earlier, can also be used in scene optimization. For example, one could optimize a scene not only to the properties of that image, but to the scene as it might appear at different times of day, or to different viewers. That is, the optimization routine recommends scenes that are robust to the variability that the scene may experience. Previously we described methods for capturing and generating both internal and external variability to the input scene and model. The goal of these approaches was to simulate (or capture) the expected variation of the actual scene. For example, one method for capturing the variability of observers is to vary the parameters of the visual attention model (for example, the weights of the individual feature maps for calculating saliency) and running these models on the same image. Running each scene configuration through multiple instantiations of different model parameters (internal variability) would give multiple scores for a particular scene configuration—one attentional sequence for each model. By taking the average score for each model configuration, one could generate an expected score for the scene configuration with the given variability. One might recommend the scene configuration that provides the best score on average.

Also, one may define a visual goal in terms of robustness, and then optimize a scene's object (or objects) to particular robustness values.

Visibility Duration

As mentioned with respect to the robustness discussion, above, different objects or different scenes may have different visibility durations. As a reminder, visibility duration refers to the period of time that an object and/or scene will be viewed. Visibility durations, which may be specified in terms of time will typically be translated into the number of predicted attentional fixations (or salient regions) that will be considered in the optimization routine. The visibility duration would be used to limit the set of fixations that would be used for the analysis of the various scenes. More specifically, it will be used in the visual goal analysis.

The visibility duration may have an effect when considering multiple visual goals. As an example, one may have a document or content that has six visual goals with different rewards—say the reward values are 1, 2, 3, 4, 5, 6. If the content is displayed on a digital sign for 5 seconds, and people make about 2 fixations per second, this translates to a visibility duration of 10 fixations. Given that the visibility duration is 10 fixations, the visibility duration is long enough to capture all of the visual goals. Under this condition, the model would make the saliency of the six items relatively equal (assuming no other objects in the scene and an equal cost for making changes). The reason the optimization routine with visibility duration will make the visual goals roughly equal, is that the model is more likely to attend to all of the targets under this condition. If the saliency of one of the targets (say the object with the highest reward) is significantly higher than that of one of the other objects (say the one with the lowest saliency) then most visual attention models will attend to the most salient object first, then the second most salient, but eventually, it will typically return to the most salient object again. If there is no additional reward for returning to a previous object, this attentional fixation will not increase the overall reward. However, by making the objects relatively equal in saliency, the model is more likely to attend to all of the target objects and thus achieve more (if not all) of the visual goals given the visibility duration. This aspect of the optimization routine and the visibility duration is very different than simply making the saliency of the object correlated with the target object's reward or relevancy.

Figure 12:
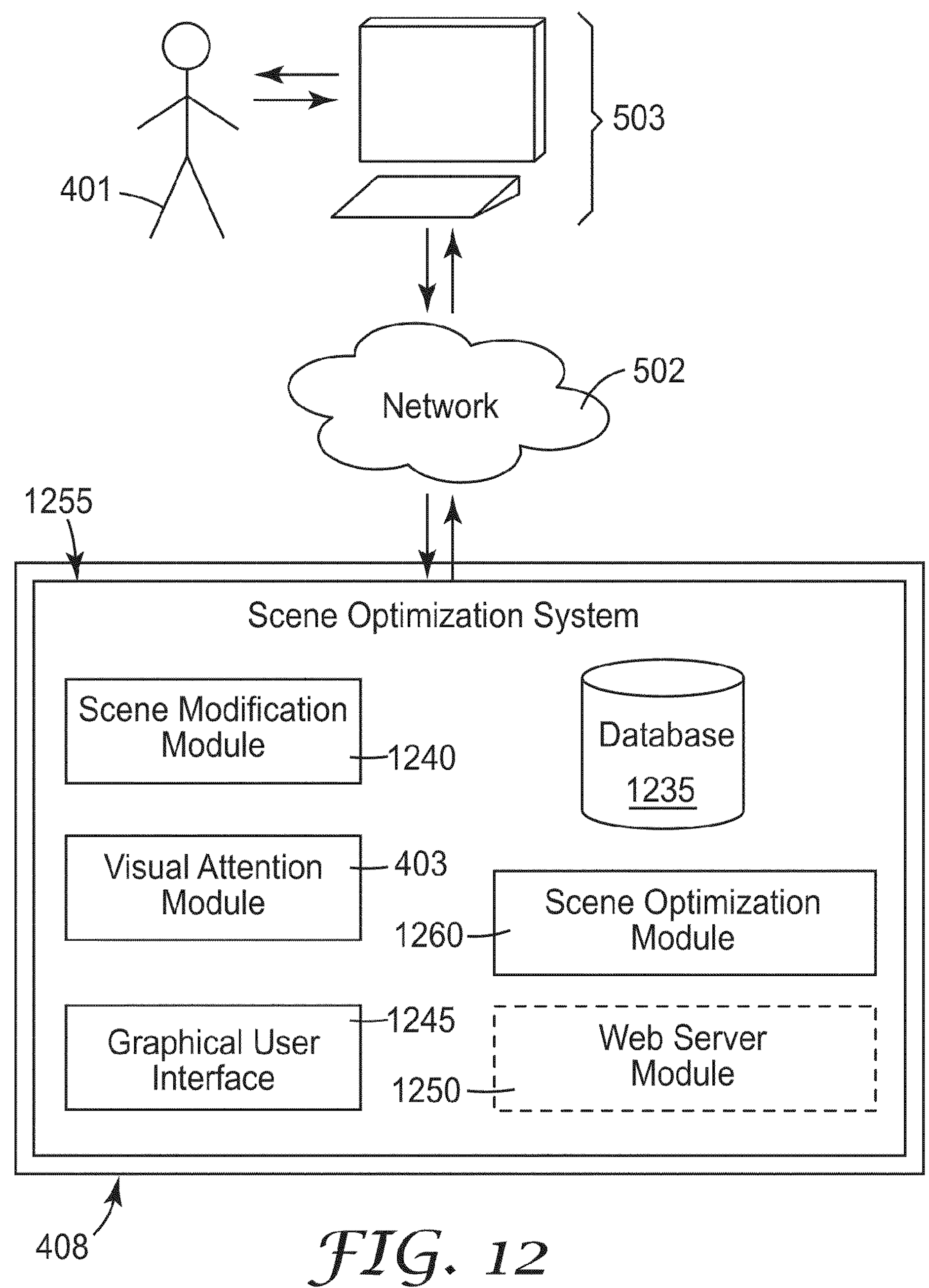
FIG. 12 is a diagram of functional modules in a system for scene optimization.

FIG. 12 is a high-level diagram of scene optimization system 1255. Like-named components in this figure are similar in functionality and capability to those modules discussed earlier. Scene optimization system 1255 includes database graphical user interface 1245, which receives input from user 401, via computer 503, over network 502, to define one or more visual goals for a scene, as well as possible changes to the scene. These possible changes to objects in the scene are stored in database 1235. Scene optimization module 1260 iterates explores the universe of possible scenes that meet the visual goal, and invokes scene modification module 1240 to modify scene input in ways consistent with the possible changes defined by user 401. This produces a modified scene, which is provided to visual attention module 403, which provides output relevant to visual attention, which is stored in database 1235. Scene optimization system 1255 may include web server module 1250 if user 401 is remote (and as shown in FIG. 12).

Multi-Perspective Scene Analysis

Up until this point the description has focused primarily on visual attention modeling utilizing a single, static image or a movie to predict where attention will be allocated within an image or images. These two approaches are often useful for many situations, but are limited in that they operate on a single two-dimensional view of what is in reality a complex three-dimensional scene.

Figure 13A:
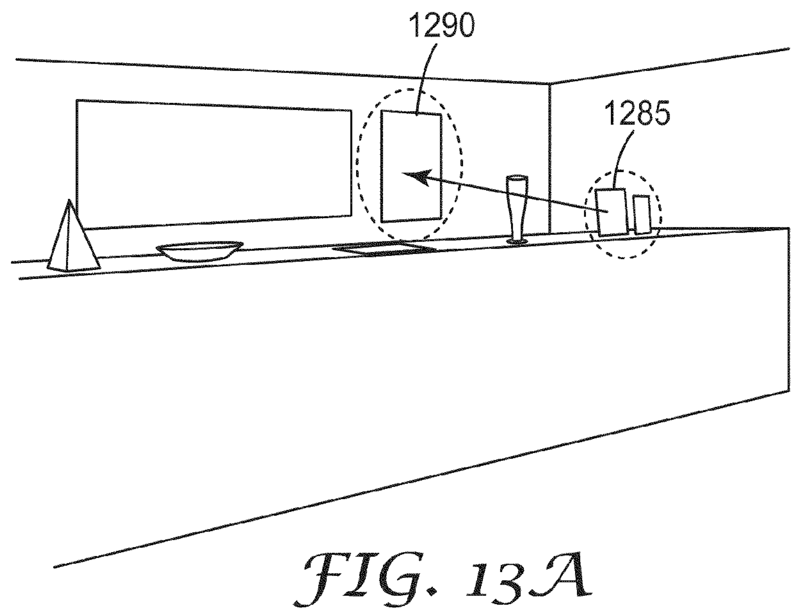
FIGS. 13A and 13B are an artist's rendering of two respective scenes.
Figure 13B:
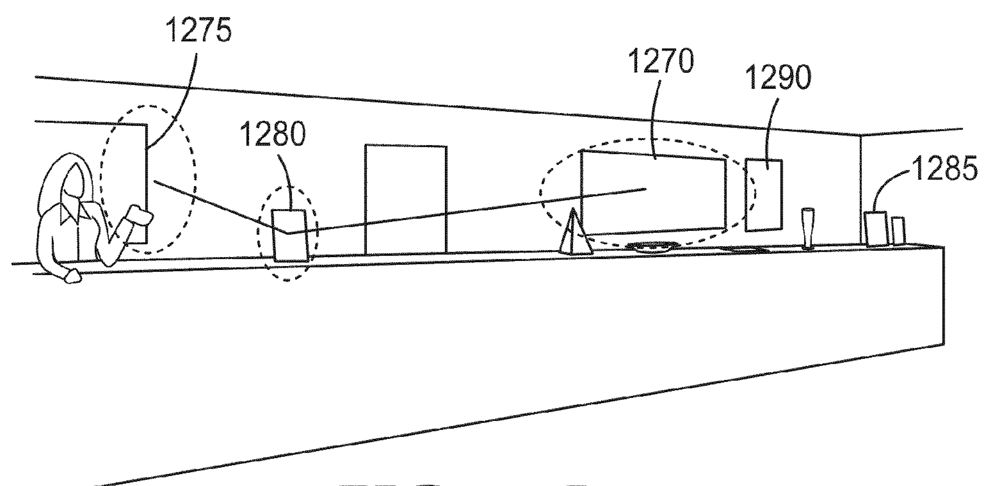

In the 3D world in which we live, small changes in perspective (orientation and/or position) can have significant changes on the image that is projected upon the observer's retina. Objects that are visible from one perspective may not be visible at all in another. Furthermore, the spatial relationships (that is, the position of the projected image of one object on the retina relative to a second object) between objects can change significantly from one perspective to another. Because changes in perspective can generate large variations in the images that are projected to the retina, they will also have significant effects on where human visual attention will be allocated within a scene. For example, FIG. 13A is an artist's rendering of a hotel lobby scene including a reception desk having digital sign 1290 behind the desk. The scene has been analyzed by a visual attention model which predicted the two objects that draw the most attention in FIG. 13A are the digital sign 1290 and advertisement card 1285. FIG. 13B is the same reception area in the same hotel lobby, but digital sign 1290 is not among the several objects identified by the visual attention model. If the visual goal is to have patrons attend to the digital sign 1290 and only the scene shown in FIG. 13A is analyzed, there will be a false sense of security that the visual goal is being consistently met. Thus there is a need to have an effective way to measure and evaluate scene content within a 3D scene.

Note that 3D scene evaluation (which herein we refer to as multi-perspective scene analysis) is not the same as merely extending 2D visual attention analysis to such things as movie sequences. Such an approach may provide data from many perspectives, but ultimately has limitations similar to that of the single image approach, in that it may provide one with an ability to analyze the allocation of attention for a particular movement through space, but it may not provide the ability to consider other paths and/or movements through the space. Neither a visual attention analysis of static scenes nor a plurality of static scenes in succession (videos) effectively deals with the fact that the images are derived from a 3D setting.

So, then, it may be useful to have a multi-perspective visual attention modeling process that accommodates three dimensions and the myriad ways in which an observer may traverse a geographic space that is the three dimensions.

Figure 15:
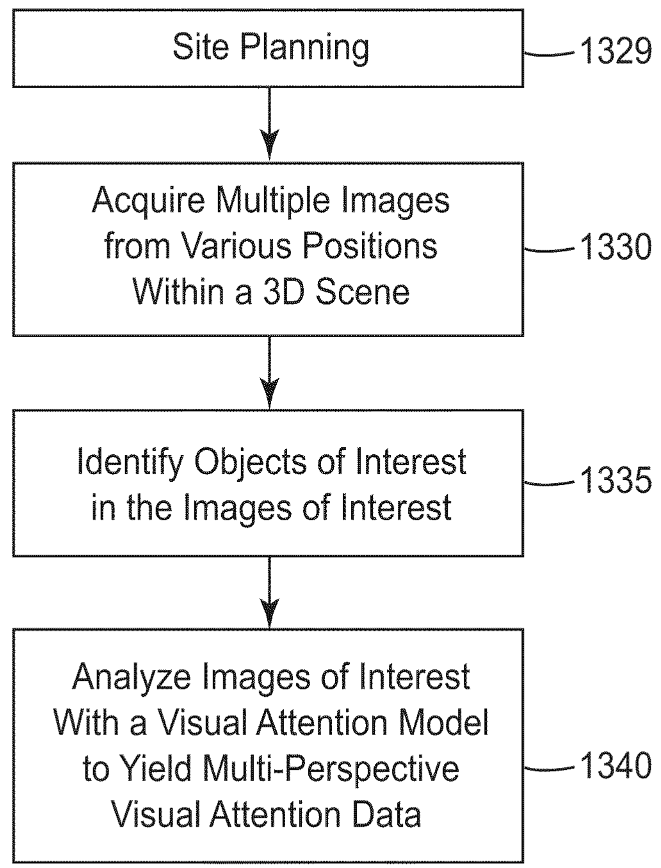
FIG. 15 is a high level flowchart showing multi-perspective scene analysis.

FIG. 15 is a flowchart showing the multi-perspective visual attention modeling process. The process begins with site planning (step 1329), which consists of determining which locations and objects within the 3D scene one wants to analyze. In practice, this may mean acquiring or developing a floor plan of the 3D scene that will be analyzed, and determining locations in the floor plan that will be representative of the observing perspectives of users. Of course, absent a floor plan of the 3D scene, a less rigorous approach could be used, in which the user simply goes to the site and makes decisions about which locations are of interest and takes photographs from those locations. Additionally, the user might record the position and orientation of where the image was taken, which could be useful for reporting purposes.

Rather than photographs, video technology in which frames are captured from the video or video sequences could also be used. When frames (images from video) or images (from digital cameras, or example) are used, the user can also use view interpolation techniques to generate views that are between two different images. As mentioned earlier, the images are not limited to being generated from a real environment, but they can also be generated from synthetic (virtual) environments. However, in both cases, one must record or pre-specify the locations in the environment where the images are taken from, and the perspective of the camera (which way the camera is pointed). A simple approach is to specify locations, then have each successive image be generated from a perspective that advances 90 degrees around the north, east, south, west axis (as is done in an example below). But absent pre-specifying locations and camera aiming protocol, the camera could instead be tracked using GPS tracking technology possibly in combination with optical tracking technology. For example, an instrument or instruments would be attached to the camera such that every time an image is taken, the system would record the three positional dimensions (X,Y,Z) and the three orientation dimensions (yaw, pitch and roll) to provide an explicit representation of the viewpoint from which the image is captured. These six values would be stored in memory and associated with the image captured at that time. Of course, cameral position and orientation could be manually recorded.

With the 3D scene determined, next multiple images from the 3D environment are received, the multiple images representing a set of views that an observer may experience as the observer interacts and navigates through a 3D environment (step 1330). In one embodiment, this is accomplished by taking multiple photographs taken from multiple positions and orientations within the 3D scene (again, such as the lobby of a hotel). In another embodiment, a video is made of the 3D scene, with shots taken from multiple representative areas an observer might be expected to be at. In yet another embodiment, a virtual 3D model is used and views are generated by moving a virtual camera through the virtual 3D model. No matter how generated, the result is a plurality of 2D images from various positions within the 3D scene. Data representative of the location within the 3D environment and the camera orientation are also collected, if not pre-specified. This data will allow one to evaluate a scene from many perspectives along with evaluating many different paths that an observer might take through a 3D space.

Figure 14A:
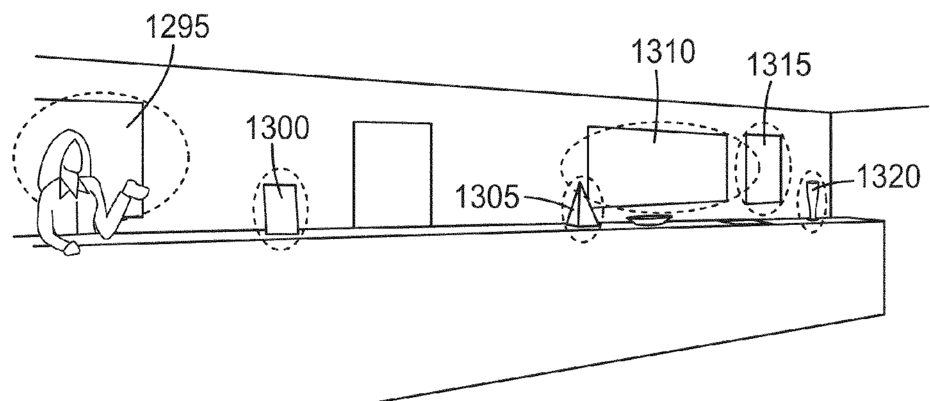
FIGS. 14A and 14B are an artist's rendering of two respective scenes.
Figure 14B:
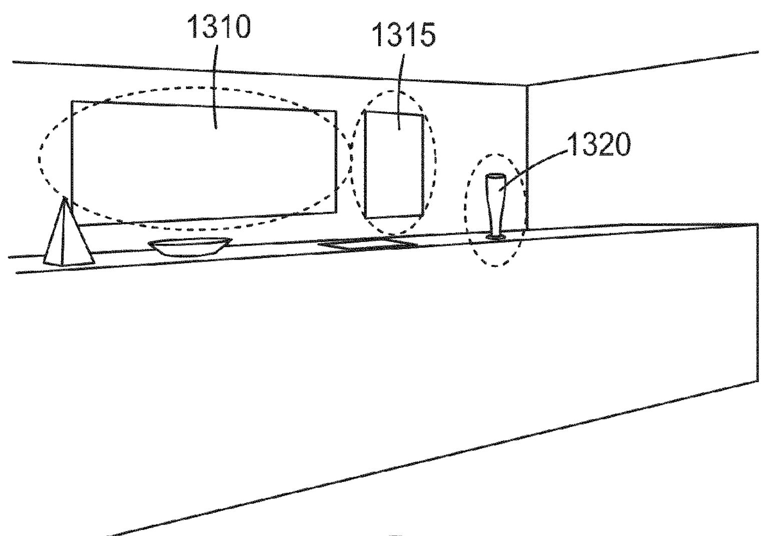

Once images are collected, the regions of the two-dimensional image that correspond to the objects of interest are selected and identified (step 1335). This can be accomplished using a number of different methods which might include (but are not limited to) methods that automatically extract these objects, manual selection of regions, or even hybrid approaches that use both automated and manual tagging and labeling techniques. An illustration of graphical results of one method (manual) for accomplishing this process is shown FIG. 14A and FIG. 14B. The objects such as mural 1310, digital sign 1315, and vase 1320 have all been identified by a manual selection process.

Next, the images including the objects of interest are processed using a visual attention model to produce visual attention data (step 1340). As earlier mentioned, one such model is that described by Itti and Koch (2001) but any visual attention model could be used. The two-dimensional locations where the model predicts that visual attention will be allocated when an observer is at each viewpoint are then recorded in, for example, a database. These locations are then compared to the regions that have been tagged and labeled for each viewpoint to determine which objects within the visible area the model predicts will receive attention.

After analyzing each individual viewpoint and computing which objects the model predicts will attract visual attention for each individual viewpoint, data concerning which objects will be attended from which locations is generated and stored. This data may then be used to, for example, determine the likelihood that a particular object will be viewed (at all) by a potential observer as she traverses the 3D scene; the percentage of potential observers that will in fact observe particular objects within the 3D scene; the likelihood of an object being attended to for a sub-set of particular views (may be useful for analyzing information about particular travel paths, such as entering a lobby versus exiting the lobby), or the likelihood that an object will be attended when that object is viewable (some objects may need to inconspicuous from most of the possible viewpoints within the environment, but for the viewpoints that the object is viewable, one may want to have a high degree of certainty that attention will be drawn to it), or the viewpoints within a 3D scene that an object is visible (or that the object will be attended to).

This 3D visual attention modeling may be combined with the systems and methods discussed above with respect to scene optimization. The visual goals that could be defined with respect to 3D visual attention modeling, however, may be different. For example, the visual goals may be defined such that 90% of potential observers do in fact observe a particular digital sign at some point while traversing a hotel lobby.

As an example of applying 3D visual attention modeling combined with scene optimization, consider a case where one may want an object to remain inconspicuous when observed from some viewpoint but be conspicuous from other viewpoints when the object becomes relevant. For example, a hotel that has three different forms of advertising content that it wants its customers to view and attend to during their visit. A first content is advertising a special on room upgrades; a second content is advertising a special on room service; and a third content is advertising tickets for a play that is being held in the ballroom of the hotel. These different forms of content are relevant at different times during the customer's visit. The room upgrade is relevant when the customer is checking into the hotel but is not relevant at other times. Room service is relevant when the customer is going to their room, but not necessarily when the customer is leaving the hotel. The play tickets, in contrast, are relevant to customers at almost any time. Using the 3D visual attention modeling techniques combined with the scene optimization techniques (both described above) one can optimize the placement and content of these advertising materials in the following way. First, one can determine the locations in the hotel lobby where the information would be most relevant. For example, the room upgrade is relevant when the customer is checking into the hotel, which usually occurs when the customer is standing in front of the check-in counter. Areas next to an elevator might be best for general advertising (such as play tickets). Just as a hotel may want certain signs conspicuous from viewpoints corresponding to certain tasks (for example check-in, or going to one's room), the hotel would also want signs that are not relevant to be inconspicuous (for example, room upgrade when waiting for an elevator). One may analyze the position and content of the advertising material based upon the set of positions and orientations that one might be in when standing at the check-in counter.

Figure 16:
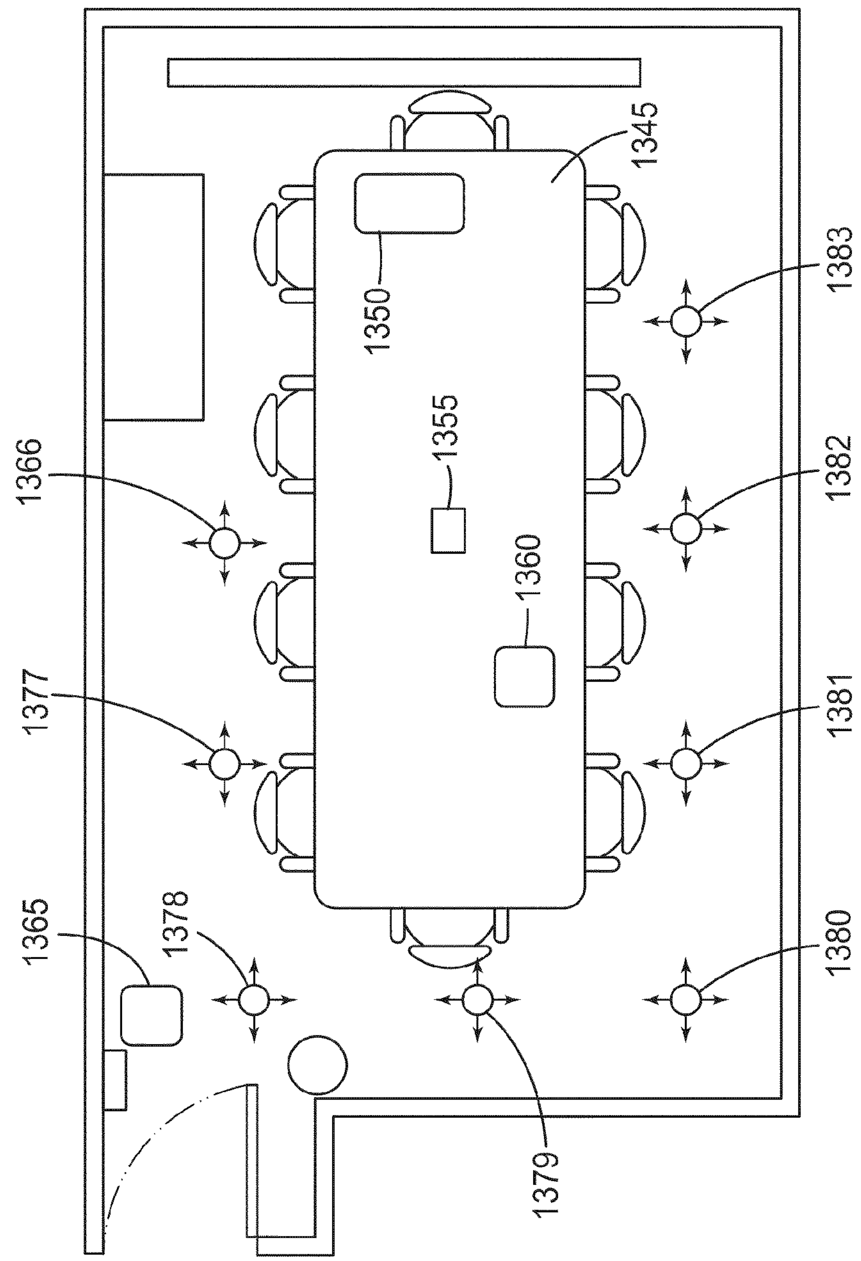
FIG. 16 is a diagram of a conference room.

To test one embodiment of the above-described 3D visual attention modeling and scene optimization method we took as our test 3D scene a standard conference room, a diagram of which may be seen in FIG. 16. The conference room included a table 1345, a yellow sign 1350, green basket 1360, telephone 1355, purple sign 1365, as well as other typical things one would expect to find in a conference room (chairs, waste basket, screen). Representative points from which an observer might be expected to view the room were determined manually, yielding eight representative observing locations (observing locations 1366, 1377, 1378, 1379, 1380, 1381, 1382, and 1383). For this test, the observing locations were spaced approximately 4 feet apart throughout the unencumbered regions (no furniture) of the room. Four images were taken, using a digital camera, from each of the eight observing locations, to yield 32 images. The arrows extending outward from the observing locations indicate the general direction the digital camera was aimed for each picture—about a 90-degree orientation difference for each picture at each observing location. The location and orientation for each of the 32 different images was recorded.

Figure 17A:
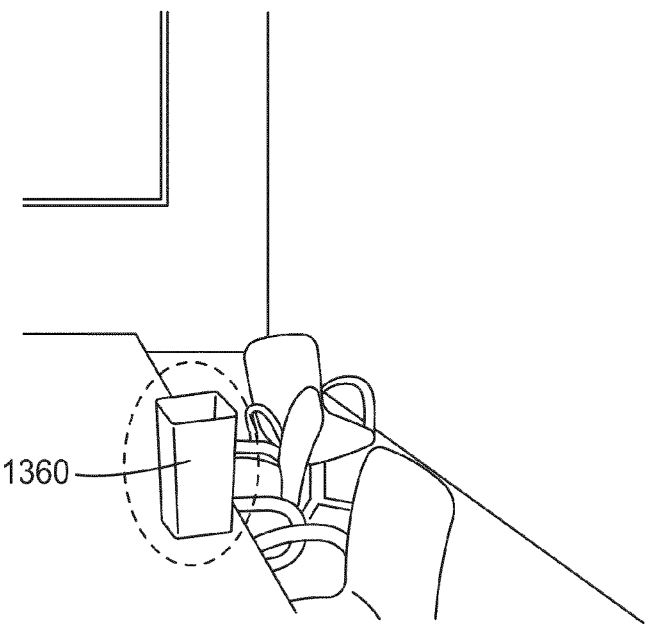
FIGS. 17A and 17B show different perspectives of the conference room.
Figure 17B:
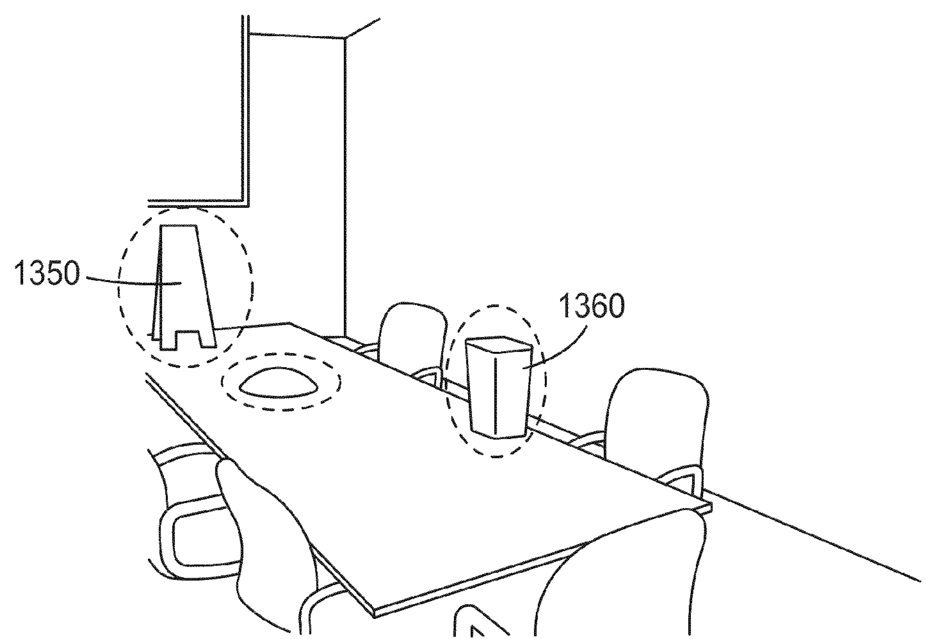

We then identified and tagged the pixels associated with 12 different objects that were found in at least one of the 32 images. This was done by having a user select the polygon region that defined the 2D region encompassing the object of interest on each of the 32 images. FIGS. 17*a* and 17B shows an artist's rendering of two of the 32 images, where polygons encircle objects of interest, such as green basket 1360 and yellow sign 1350. "Tagging" simply refers to naming the regions that comprise objects (such as "yellow sign"). Note that the polygons encircling the objects are representative of the tagging software's purpose; the underlying images are not actually modified with the polygon; the identified regions, once specified by the user, are not signified in any way on the original image.

After tagging and labeling the images, the images were submitted to a visual attention model to collect the locations in the image where the model predicts visual attention will be allocated. After submitting all of the images, the computer recorded, for each image, the x,y coordinates where the model predicted that visual attention would be allocated. The computer also calculated for each of these attention fixations whether it fell within a region of the image that was tagged and labeled by the user. The computer also recorded each image that included a tagged region that was not predicted to receive attention (a "miss"). All data was stored in a database, which was then used to generate a series of summaries concerning the conspicuity of the objects within the scene.

Figure 18:
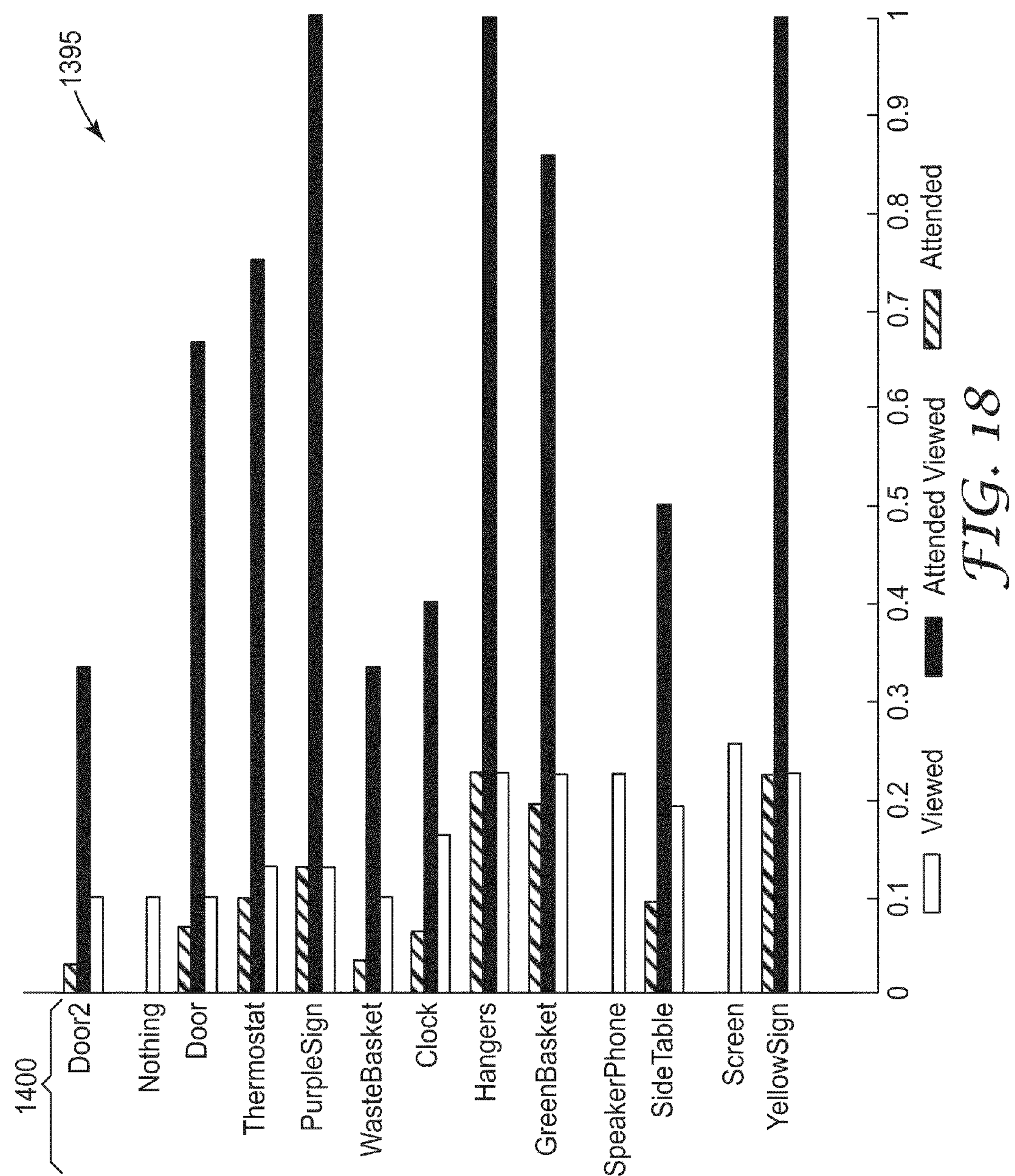
FIG. 18 is a graph illustrating three different example analyses done to various objects in the conference room.

FIG. 18 shows graph 1395 illustrating three different example analyses that were done for the 12 objects 1400 tagged and labeled within the conference room. The first analysis is the likelihood that the object is visible or viewable (p(Visible)). This is the ratio of the images in which the object is in the image divided by the total number of images. p(Visible) is, then, a metric giving some indication of how well placed the object of interest is within the setting. The metric that is determined is the likelihood that the object was attended given that it was visible (p(Attended|Visible)), which was calculated by taking all of the images in which the object was visible and identifying whether the visual attention model predicted that a fixation would occur in the region defining the particular object. The metric calculated was the likelihood that a particular object will be attended at all (p(Attended)), which is calculated by taking the number of images in which the model predicted attention allocation to an object at least once, then dividing that value by the total number of images.

Multi-perspective scene analysis represents the fact that a target object can be viewed from many different distances. For example, consider the billboard example described above. As one is driving down a long flat road, there are many opportunities to attend to, and thus process the billboard. By contrast, for another billboard, there may be a hill or a group of trees that are occluding the sign until the very last minute. By taking into account these different viewpoints, one can more accurately analyze the likelihood that an object will receive visual attention from the different perspectives that it can be viewed. Without multi-perspectives, and using only a single view, one may incorrectly predict that an object will or will not receive visual attention given the number of perspectives that it could be attended.

FIG. 18 shows a subset of possible evaluations that one could carry out on data resulting from the analysis described above. There are a number of conclusions one could draw from the data. First, note that the PurpleSign object is visible (white bar on graph) less often than the Screen object (that is, it was in fewer of the images taken within the environment). However, if we look at the black bars for these two objects, we see that when the PurpleSign is visible (that is, it is present in the image) it is always attended (p(Attended|Visible)=1.0), but when the screen is visible, is never attended. This suggests that although the PurpleSign is located at a place where it won't be seen very often, when it is in view the model predicts that attention will be allocated to it.

The PurpleSign object is, then, generating the types of properties that were discussed as desirable earlier in the context of the hotel lobby. That is, the sign is not visible from many locations (it is inconspicuous) but when people are in a location where it is visible (by the check-in counter), they will almost always attend to that object. This is illustrated by the fact that the probability that the PurpleSign object is visible (white bar) is about 15%. But the probability that attention will be captured by the PurpleSign when it is visible (black bar) is 1.0.

Figure 19:
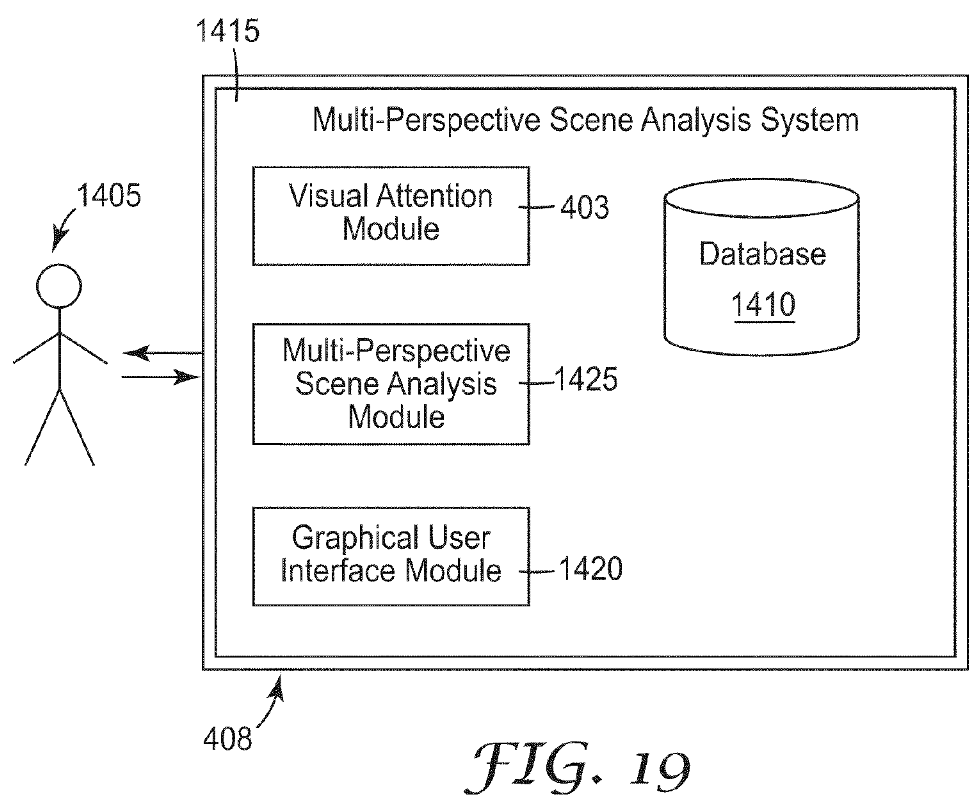
FIG. 19 is a diagram of a multi-perspective scene analysis system.

FIG. 19 is a block diagram showing high-level functional modules that comprise a multi-perspective scene analysis system 1415, which in various embodiments may perform the multi-perspective visual attention modeling process described with respect to FIG. 15. It resides, in one embodiment, in a computer system 408, which includes a number of other functional modules (such as an operating system), and hardware, such as a memory or processor (neither of which are represented in FIG. 19). Though shown in FIG. 19 as a single computer, in practice various portion of the functionality could be spread among several or many computers in a networked configuration. Multi-perspective scene analysis system 1415 includes visual attention module 403 (discussed above). It also includes multi-perspective scene analysis module 1425 which invokes, as needed, visual attention module 403 to do the analysis of interest (discussed earlier with respect to step 1340 of FIG. 15), and receive results from the analysis (including which defined objects were identified by the visual attention module in which images), and stores these results, or summaries of the results, in database 1410. Database 1410 is any data storage device or system, such as a computer flat file, computer memory, or a database. Multi-perspective scene analysis system 1415 also includes graphical user interface module 1420, which facilitates the input of multiple images (acquired in step 1330 in FIG. 15), then, in this embodiment, facilitates the identification and tagging (step 1335 in FIG. 15) of objects of interest within the images.

User 1405 is any person or other computer system interested in interacting with the multi-perspective scene analysis system. In one embodiment, user 1405 is a consultant hired by a company to analyze and recommend configuration changes to a 3D scene owned or controlled by the company.

Often times a viewer will remain in the same location for a reasonable period of time. For example, someone may be waiting in line to check out from a grocery store, a home improvement store or a hotel. During this time the individual may engage in a "visual foraging" task. Visual foraging is a situation in which observer is not looking for anything in particular, but simply looking around the environment for something that is interesting. During this visual foraging the person will attend to different pieces of information by moving his eyes and when his eyes reach the edge of their rotation axis, the person will move his head. Typically he will move his head and eyes such that the item of interest is at the center of fixation. Current state-of-the-art does not simulate this type of re-centering action on the images. Instead, when an image is analyzed, the center of the image always remains fixed. This is true even when the fixation point is at the edge of the image (or visual field). Without re-centering, the current state-of-the-art approach will only be able to fixate to the edge of the image but will never fixate beyond that point. Humans, by contrast, will attend to the edge of their visual field and rotate their head so their eyes are re-aligned to the center of gaze. This would allow the visual system to make another fixation in the same direction. With a single image, one cannot make a fixation in the same direction due to the fact that there is no more information off of the edge of the image.

The systems and methods described herein can, in some embodiments, use multiple views of a scene or a single pan oramic view to simulate the re-centering of the eyes during visual foraging. This could be done as follows:

1. Generating multiple images from a single viewpoint. The images are generated by using a 360-degree panoramic camera or multiple single images rotated around the viewing axis (vertical or otherwise). Multiple images may be taken in which the views "overlap" one another. The orientations of the views would also be assigned to each view.
2. An initial view ("starting view") is given to the visual attention model. The view can be determined by the typical viewing orientation that someone starts their visual foraging (for example, in a store line, it might be looking "forward" toward the cashier). One can also start with a randomly selected orientation. In the case of a panoramic view, a "slice" of the panoramic view could be used centered on the "starting" view. In the case of multiple views/images, the image that is centered closest on the starting location would be used.
3. The "starting view" is analyzed with a visual attention model. The initial fixation is predicted by the model. The orientation of this fixation would be calculated (this can be done using trigonometry). If a panoramic view is used, a new "slice" of the panoramic view would be made centered on this new fixation. If multiple images are used, the image that is centered most closely to this new fixation would be used.
4. With the new view, the system would analyze for the next salient region.
   a. The process then repeats (determine fixation, then center the viewpoint).

EXAMPLES

Several non-limiting examples are provided below which show how the aforementioned systems and methods may be put to practical use.

Example 1

Robustness Calculation Using External Variation

Background: A hotel owner wants to install two digital signs in the hotel lobby. She wants them noticed by customers and can put them in any of 3 potential locations, resulting in 3 possible configurations of two digital signs (that is, signs at locations 1-2, 1-3, or 2-3). Robustness is calculated to recommend the best sign locations to be noticed.

1. Capture an image of the hotel lobby using a digital camera, download the image to a computer capable of running an attention model. The computer has visual attention modeling software installed, (for example Koch & Itti), along with Matlab™ (available from The MathWorks, Natick, Mass.).

2. Modify the image to include simulated digital signs. Generate three modified images, each simulating two digital signs such that all combinations of two signs in the three potential locations are produced. Use a standard digital photograph manipulation program such as Photoshop™ (available from Adobe Co., San Jose, Calif.). Each simulated digital sign is properly scaled and has simulated content, such as a graphic of the hotel logo. Store the image regions, as defined by pixel addresses, associated with each of the three digital sign locations in a file on the computer.

3. Run the modified images through the attention model. The output will include the predicted salient regions of the modified images. Each salient region is compared to the digital sign pixel addresses stored in Step 2. If the salient region falls within or overlaps with the stored pixel addresses, then the predicted attention goes to the desired location. Each of the three modified images shows the digital signs to be in the top ten fixations, thus confirming that any of the three locations is a good candidate.

4. Capture multiple images of the same scene, either using a series of still photos or using a video and sampling images from the video stream. Images are taken every 5 minutes over a 16 hour period, thus capturing the scene external variability resulting from a variety of lighting conditions and pedestrian movements. The goal is to have the sign locations robust to these types of variability (lighting and pedestrian movements). Load these images into the computer and modify them with simulated digital signs as described in Step 2.

5. Each modified image from step 4 is analyzed by the attention model and compared to the stored pixel addresses as described in Step 3. The series of modified images associated with sign locations 1 and 2 showed that predicted fixations went to both digital sign locations in 20% of the images. Similarly, locations 1 and 3 had 35% of fixations going to both sign locations, while locations 2 and 3 had 85% of fixations going to both sign locations. Having signs installed at locations 2 and 3 resulted in the most robust configuration, providing the best solution for the hotel. Recommend this solution to the hotel owner.

Example 2

Robustness Calculation Using Internal Variation

Background: A hotel owner wants to install two digital signs in the hotel lobby. She wants them noticed by customers and can put them in one of 3 potential locations, resulting in 3 possible configurations of two digital signs (that is, signs at locations 1-2, 1-3, or 2-3). Robustness is calculated to recommend the best sign locations to be noticed.

1. Capture an image of the hotel lobby using a digital camera, download the image to general purpose computer capable of running an attention model. The computer has visual attention modeling software installed, (for example Koch & Itti), along with Matlab™ (available from The MathWorks, Natick, Mass.).

2. Modify the image to include simulated digital signs. Generate three modified images, each simulating two digital signs such that all combinations of two signs in the three potential locations are produced. Use a standard digital photograph manipulation program such as Photoshop™ (available from Adobe Co., San Jose, Calif.). Each simulated digital sign is properly scaled and has simulated content, such as a graphic of the hotel logo. Store the image regions, as defined by pixel addresses, associated with each of the three digital sign locations in a file on the computer.

3. Run the modified images through the attention model. The output will include the predicted salient regions of the modified images. Each salient region is compared to the digital sign pixel addresses stored in Step 2. If the salient region falls within or overlaps with the stored pixel addresses, then the predicted attention goes to the desired location. Each of the three modified images shows the digital signs to be in the top ten fixations, thus confirming that any of the three locations is a good candidate.

4. Begin with the basic visual attention model of Koch & Itti, as specified in Step 1. Specify the number of model variations to utilize in analyzing the modified images (for example, 100 model variations). Each visual attention model has three different feature maps (color, orientation, and luminance); the saliency map is computed as a weighted combination of each of these maps. The basic visual attention model sets the weighting parameters for each map as equal (1, 1, 1). To produce 100 model variations, randomly set the weighting vector for each model. This is completed by an algorithm that randomly sets each weight and normalizes the sum of the weights to 3 (3*(RandWeights/sum(RandWeights)).

5. Analyze each image by the 100 visual attention model variations (defined by the 100 random weighting values) and compare the results to the stored pixel addresses as described in steps 2 & 3. The series of modified images associated with digital sign locations 1 and 2 shows that predicted fixations go to both digital sign locations in 20% of the images. Similarly, locations 1 and 3 have 35% of fixations going to both sign locations, while locations 2 and 3 have 85% of fixations going to both sign locations. Having signs installed at locations 2 and 3 will result in the most robust configuration for the hotel. Provide this recommendation to the hotel owner.

Example 3

Scene Optimization

Background: A hotel owner wants to visually optimize her lobby and the content displayed on two digital signs. Her specific visual goals are for customers to notice four target objects: a first and a second digital sign, a static graphic sign advertising the hotel restaurant, and the staff behind the check-in counter.

1. To generate a score for optimization options, rewards are given for changes that draw attention to the target objects, and real-world costs are associated with permissible changes. An estimated cost in dollars relating to labor and supply costs is assigned to the potential changes being considered:

moving a painting currently located behind the check-in counter: $100, changing the lighting behind the restaurant sign: $2500, and redesigning content displayed on the two digital signs: $250 dollars each.

Reward values assigned for achieving the visual goals are as follows:

drawing attention to the two digital signs: $500 each, drawing attention to the restaurant sign: $250, and drawing attention to the staff behind the check-in counter: $150.

2. Capture an image of the existing lobby using a digital camera, download the image to a computer capable of running an attention model. The computer has visual attention modelling software, e.g. Koch & Itti, along with Matlab™ (The MathWorks, Natick, Mass.).

3. Modify the image to reflect the changes being considered, so as to create a plurality of images associated with all possible combinations of possible changes. Use a standard digital photograph manipulation program such as Photoshop (Adobe, San Jose, Calif.). The pixel addresses of the target objects associated with the customer's visual goals are also specified and stored in memory.

4. Analyze each image from Step 3 using the attention model and compare the salient objects predicted by the model to the stored pixel addresses for the target objects. A score is computed for each simulated configuration by subtracting the costs for changes from the reward values for achieving the visual goals in the modified image, indicated by an overlap of the predicted visual attention with the pixel addresses for the target objects. For example, when attention is allocated to the restaurant sign, using the change of moving the painting, the score is $250−$100=$150. After analyzing all of the simulated images, the most cost effective solution found is to move the painting at a cost of $100 and to modify the color of one of the pieces of content at a cost of $250 (total cost $350). These changes allow all of the visual goals to be achieved, yielding a reward score of $1400 and a total score of $1050.

Example 4

Multi-Perspective Scene Analysis

Background: Continuing from Example 3, recommended changes have been made. The hotel owner would like to understand the visual saliency of each target object as viewed from multiple perspectives in the hotel lobby.

1. Four locations of interest, distributed throughout the lobby, are identified and four digital photos are taken from each location by turning the camera in 90 degree increments, resulting in a total of 16 images, each image representing one perspective. The images are photos taken using a digital camera. The images are and downloaded to a computer capable of running an attention model. The computer has visual attention modeling software, for example Koch & Itti, along with Matlab™ (The MathWorks, Natick, Mass.). For each perspective, the pixel addresses for the target objects are identified and stored in the computer's memory, and the target objects tagged with an identifier.

2. Each of the 16 images from Step 1 are analyzed using the attention model. For each image, it is determined by the visual attention model which target objects are visible and which target objects are predicted to draw attention.

3. The probability that each target object is visible across all of the images is computed, and the probability that it is attended to is also computed. This data is presented in a report to the hotel owner, providing a better understanding of the visual characteristics in the lobby from a variety of perspectives.

Note that the example applications for the methods and systems described herein have broad application beyond the specific applications discussed. For example, these applications include retail environments.

The invention claimed is:

1. A computer system comprising:

a visual attention module operative to:

(a) receive scene;

(b) apply a visual attention model to the scene; and, (c) predict regions within the scene that tend to attract visual attention; and, a robustness assessment module operative to interact with the visual attention module to determine a degree to which at least one of the predicted regions is robust or the scene is robust, wherein the robustness assessment module is additionally provided with a duration of time that particular regions are viewable, and additionally uses the duration to determine the degree to which at least one of the predicted regions is robust or the scene is robust.

2. The system of claim 1, wherein robustness is a measure of the sensitivity of predictions output from a visual attention model to either of, or some combination of:

(a) variability within the visual properties of the scene; or, (b) variability within the visual attention model that is applied by the visual attention module.

3. The system of claim 2, wherein the robustness assessment module is further operative to introduce variability into visual properties of the scene.

4. The system of claim 3, wherein the robustness assessment module introduces variability into visual properties of the scene by modifying the scene.

5. The system of claim 4, wherein modifying the scene input comprises systematically or randomly selecting pixels within the scene to modify, and systematically or randomly perturbing the properties of those selected pixels.

6. The system of claim 2, wherein the robustness assessment module is further operative to introduce variability into the visual attention model that is applied by the visual attention module.

7. The system of claim 6, wherein the variability is introduced into the visual attention model by modifying operating parameters of the visual attention model.

8. The system of claim 7, wherein modifying the operating parameters is done systematically or randomly.

9. The system of claim 7, wherein the operating parameters that are modified are those that control the sensitivity of the visual attention model to any of the following: color, contrast, motion, shape, spatial frequency, orientation.

10. The system of claim 2, wherein the robustness assessment module is further operative to both:

(a) introduce variability into the visual properties of the scene; and, (b) introduce variability into the visual attention model that is applied by the visual attention module.

11. The system of claim 10, wherein introducing variability into the visual properties of the scene comprises introducing visual distractors into the scene.

12. The system of claim 10, further comprising:

a database module operative to record how the predicted regions change in view of variability introduced into visual properties of the scene, or variability introduced within the visual attention model that is applied by the visual attention module, the database module also operative to record the type of variability.

13. The system of claim 12, wherein the robustness assessment module repeatedly:

(a) introduces variability into the visual properties of the scene thus generating a modified scene, and;

(b) invokes the visual attention module and provides the modified scene as input.

14. The system of claim 12, wherein the robustness assessment module repeatedly:

(a) introduces variability into the visual attention model that is applied by the visual attention module, and;

(b) invokes the visual attention module to use the modified visual attention model.

15. The system of claim 2, wherein the robustness assessment module is further operative to quantify the degree of robustness as a number, and provide this number to a computer program.

16. The system of claim 1, further comprising:

a user interface module operative to display information indicative of the degree to which at least one of the predicted regions is robust.

17. The system of claim 16, wherein the information comprises a graphical representation of the scene overlaid with heat maps associated with individual regions of the scene, the gradients of the heat maps correlated to the robustness of individual regions of the scene.

18. The system of claim 16, wherein the information comprises a number.

19. The system of claim 1, wherein the visual attention model is an empirical model.

20. A computer-implemented method comprising:

receiving scene;

providing a duration of time that particular regions in the scene are viewable, applying a visual attention model to the scene to predict first regions within the scene that tend to attract visual attention;

changing the scene so as to produce a modified scene;

applying the visual attention model to the modified scene to predict second regions within the scene that tend to attract visual attention; and, based on the first regions and the second regions and the duration of time that the particular regions in the scene are viewable, determining the degree to which one of the first regions and the second regions, or the scene, is robust.

21. The computer-implemented method of claim 20, wherein robust is a measure of the sensitivity of predictions from a visual attention model to variability within the visual properties of the scene.

22. The computer-implemented method of claim 21, wherein changing the scene comprises systematically or randomly selecting pixels within the image to modify, and systematically or randomly perturbing the properties of those selected pixels.

23. The computer-implemented method of claim 21, wherein changing the scene comprises introducing visual distractors into the scene.

24. The computer-implemented method of claim 21, wherein changing the scene comprises modifying regions that comprise objects within the scene.

25. The computer implemented method of claim 21, wherein changing the scene comprises modifying the size, color, or shape of regions that comprise objects within the scene.

26. The computer-implemented method of claim 21, wherein changing the scene comprises adjusting the brightness or contrast of the scene.

27. The computer-implemented method of claim 21, further comprising:

presenting to a user, via a user interface, information indicative of the degree to which one of the first regions and the second regions, or the scene, is robust.

28. The computer-implemented method of claim 27, wherein the information is a number.

29. The computer-implemented method of claim 20, further comprising:

providing a number indicative of the degree to which one of the first regions and the second regions, or the scene, is robust.

30. A computer-implemented method comprising:

receiving scene;

providing a duration of time that particular regions in the scene are viewable, applying a visual attention model to the scene to predict first regions within the scene that tend to attract visual attention;

changing the visual attention model so as to produce a modified visual attention model;

applying the modified visual attention model to the scene to predict second regions within the scene that tend to attract visual attention; and, based on the first regions and the second regions and the duration of time that the particular regions in the scene are viewable, determining the degree to which one of the first regions and the second regions, or the scene, is robust.

31. The computer-implemented method of claim 30, wherein robust is a measure of the sensitivity of predictions from a visual attention model to variability within the visual attention model.

32. The computer-implemented method of claim 31, wherein changing the visual attention model comprises modifying operating parameters of the visual attention model.

33. The computer implemented method of claim 32, wherein the operating parameters are modified randomly or systematically.

34. The computer-implemented method of claim 33, wherein the operating parameters are those that control the sensitivity of the visual attention model to any of, or combination of, the following: color, contrast, motion, shape, special frequency, and orientation.

35. The computer-implemented method of claim 30, further comprising:

providing output indicative of the determined degree of robustness.

36. The computer-implemented method of claim 35, wherein the output is a number.

37. The computer-implemented method of claim 36, wherein the output is provided to a computer program.

* * * * *

UNITED STATES PATENT AND TRADEMARK OFFICE

CERTIFICATE OF CORRECTION

PATENT NO. : 8,442,328 B2
APPLICATION NO. : 12/571850
DATED : May 14, 2013
INVENTOR(S) : Stankiewicz It is certified that error appears in the above-identified patent and that said Letters Patent is hereby corrected as shown below:

In the Specification

Column 5
Line 44; After "than" delete "a if".

Column 6
Line 12; Delete "by" and insert -- be --, therefor.

Column 10
Line 18; After "luminance" insert -- . --.

Column 24
Line 42; Delete "or example)" and insert -- for example) --, therefor.

Signed and Sealed this
Twenty-second Day of October, 2013

Teresa Stanek Rea
*Deputy Director of the United States Patent and Trademark Office*